(12) United States Patent
Amimoto et al.

(10) Patent No.: US 10,855,506 B2
(45) Date of Patent: Dec. 1, 2020

(54) DATA PROCESSING APPARATUS AND DATA PROCESSING METHOD

(71) Applicant: Saturn Licensing LLC, New York, NY (US)

(72) Inventors: Tatsuki Amimoto, Tokyo (JP); Yuken Goto, Tokyo (JP); Lachlan Bruce Michael, Saitama (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/066,979

(22) PCT Filed: Feb. 3, 2017

(86) PCT No.: PCT/JP2017/003939
§ 371 (c)(1),
(2) Date: Jun. 28, 2018

(87) PCT Pub. No.: WO2017/141729
PCT Pub. Date: Aug. 24, 2017

(65) Prior Publication Data
US 2019/0028311 A1     Jan. 24, 2019

(30) Foreign Application Priority Data
Feb. 18, 2016    (JP) ................................ 2016-028874

(51) Int. Cl.
*H04L 27/26* (2006.01)
*H04W 72/04* (2009.01)
*H04L 5/00* (2006.01)

(52) U.S. Cl.
CPC ........ *H04L 27/2628* (2013.01); *H04L 5/0048* (2013.01); *H04L 27/26* (2013.01);
(Continued)

(58) Field of Classification Search
CPC ............ H04L 27/2628; H04L 27/2666; H04L 5/0048; H04L 27/2611; H04L 27/26; H04W 72/04
See application file for complete search history.

(56) References Cited

U.S. PATENT DOCUMENTS

| 2008/0310530 A1 | 12/2008 | Imamura et al. |
| 2011/0216848 A1 | 9/2011 | Imamura et al. |
| (Continued) | | |

FOREIGN PATENT DOCUMENTS

| EP | 2 031 789 A2 | 3/2009 |
| JP | 2013-17202 A | 1/2013 |
| (Continued) | | |

OTHER PUBLICATIONS

International Search Report dated Apr. 25, 2017 in PCT/JP2017/003939, citing documents AA, AB, AO, AP, AX and AY therein, 2 pages.

(Continued)

*Primary Examiner* — Dac V Ha
(74) *Attorney, Agent, or Firm* — Oblon, McClelland, Maier & Neustadt, L.L.P.

(57) ABSTRACT

The present technology relates to a data processing apparatus and a data processing method which can suppress the influence of multipath propagation and the Doppler shift.
A data processing apparatus includes a processing unit which performs modulation processing on a physical layer frame including a preamble, which includes a modulation parameter, and one or more subframes, which include data, in which any modulation parameter can be set for each of the subframes, and the subframes are arranged in the physical layer frame collectively by subframe groups which are collections of the subframes with FFT sizes, which are same, when IFFT operation is performed on symbols included in the physical layer frame. The present technology can be (Continued)

applied to, for example, data transmission compliant to a broadcast standard such as ATSC 3.0.

14 Claims, 31 Drawing Sheets

(52) U.S. Cl.
CPC ...... *H04L 27/2611* (2013.01); *H04L 27/2666* (2013.01); *H04W 72/04* (2013.01)

(56) References Cited

U.S. PATENT DOCUMENTS

| 2012/0069920 | A1 | 3/2012 | Imamura et al. |
| 2012/0069939 | A1 | 3/2012 | Imamura et al. |
| 2012/0134440 | A1 | 5/2012 | Yun et al. |
| 2012/0328056 | A1 | 12/2012 | Imamura et al. |
| 2014/0153669 | A1 | 6/2014 | Imamura et al. |
| 2014/0204900 | A1 | 7/2014 | Kawasaki |
| 2016/0006593 | A1 | 1/2016 | Asjadi |
| 2017/0019285 | A1* | 1/2017 | Baek .................... H04L 27/2646 |
| 2017/0126441 | A1* | 5/2017 | Earnshaw ........... H04L 27/2605 |
| 2017/0237593 | A1* | 8/2017 | Kim ....................... H04L 27/265 375/295 |
| 2017/0257862 | A1* | 9/2017 | Xue .................... H04W 72/0446 |
| 2019/0044776 | A1* | 2/2019 | Park .................... H04L 27/2613 |
| 2019/0109741 | A1* | 4/2019 | Oh ......................... H04L 5/001 |

FOREIGN PATENT DOCUMENTS

| WO | WO 20091038350 A1 | 3/2009 |
| WO | WO 2013/046375 A1 | 4/2013 |

OTHER PUBLICATIONS

Mark Earnshaw et al., "Physical Layer Framing for ATSC 3.0", IEEE Transactions on Broadcasting, vol. 62, No. 1, Mar. 2016, pp. 263-270 and cover page.
"ATSC Candidate Standard: Physical Layer Protocol", Doc. S32-230r21, ATSC, Sep. 28, 2015, 228 pages.

* cited by examiner

DATA PROCESSING APPARATUS AND DATA PROCESSING METHOD

TECHNICAL FIELD

The present technology relates to a data processing apparatus and a data processing method, and, in particular, to a data processing apparatus and a data processing method which can suppress the influence of multipath propagation and the Doppler shift.

BACKGROUND ART

Currently, the establishment of Advanced Television Systems Committee (ATSC) 3.0, which is one of the next generation terrestrial broadcast standards, is under way (e.g., see Non-Patent Document 1).

CITATION LIST

Non-Patent Document

Non-Patent Document 1: ATSC Candidate Standard: Physical Layer Protocol (Doc. S32-230r21 28 Sep. 2015)

SUMMARY OF THE INVENTION

Problems to be Solved by the Invention

Incidentally, in the broadcast standards such as ATSC 3.0, a physical layer frame, which is a unit for transmitting data, is defined. In this type of physical layer frame, a plurality of subframes including data are arranged and control parameters can be set for each subframe.

However, if the control parameters that can be set for each subframe are freely set, the influence of multipath propagation and the Doppler shift cannot be suppressed in some cases. Therefore, proposals for suppressing the influence of the multipath propagation and the Doppler shift by appropriately setting the control parameters set for each subframe have been requested.

The present technology has been made in view of such a situation and can suppress the influence of the multipath propagation and the Doppler shift.

Solutions to Problems

A data processing apparatus according to a first aspect of the present technology is a data processing apparatus including a processing unit which performs modulation processing on a physical layer frame including a preamble, which includes a modulation parameter, and one or more subframes, which include data, in which any modulation parameter can be set for each of the subframes, and the subframes are arranged in the physical layer frame collectively by subframe groups which are collections of the subframes with FFT sizes, which are the same, when inverse fast Fourier transform (IFFT) operation is performed on symbols included in the physical layer frame.

The data processing apparatus according to the first aspect of the present technology may be an independent apparatus or may be an internal block configuring one apparatus. Moreover, a data processing method according to the first aspect of the present technology is a data processing method compatible with the data processing apparatus according to the first aspect of the present technology described above.

In the data processing apparatus and the data processing method according to the first aspect of the present technology, the modulation processing is performed on the physical layer frame including the preamble, which includes the modulation parameter, and the one or more subframes, which include the data, any modulation parameter is set for each of the subframes, and the subframes are arranged in the physical layer frame collectively by the subframe groups which are the collections of the subframes with the FFT sizes, which are the same, when the inverse fast Fourier transform (IFFT) operation is performed on the symbols included in the physical layer frame.

A data processing apparatus according to a second aspect of the present technology is a data processing apparatus including a processing unit which performs demodulation processing on a physical layer frame including a preamble, which includes a demodulation parameter, and one or more subframes, which include data, in which any demodulation parameter can be set for each of the subframes, and the subframes are arranged in the physical layer frame collectively by subframe groups which are collections of the subframes with FFT sizes, which are the same, when fast Fourier transform (FFT) operation is performed on symbols included in the physical layer frame.

The data processing apparatus according to the second aspect of the present technology may be an independent apparatus or may be an internal block configuring one apparatus. Moreover, a data processing method according to the second aspect of the present technology is a data processing method compatible with the data processing apparatus according to the second aspect of the present technology described above.

In the data processing apparatus and the data processing method according to the second aspect of the present technology, the demodulation processing is performed on the physical layer frame including the preamble, which includes the demodulation parameter, and the one or more subframes, which include the data.

Furthermore, any demodulation parameter is set for each of the subframes, and the subframes are arranged in the physical layer frame collectively by the subframe groups which are the collections of the subframes with the FFT sizes, which are the same, when the fast Fourier transform (FFT) operation is performed on the symbols included in the physical layer frame.

Effects of the Invention

According to the first and second aspects of the present technology, the influence of the multipath propagation and the Doppler shift can be suppressed.

Note that the effects described herein are not necessarily limited, and any one of the effects described in the present disclosure may be exerted.

MODE FOR CARRYING OUT THE INVENTION

Hereinafter, embodiments of the present technology will be described with reference to the drawings. Note that the description will be given in the following order.
1. Outline of Existing Standards
2. First Embodiment (Countermeasure against Multipath Propagation)
 (1) Existing Configurations
 (2) Method for Setting Control Parameters
 (3) System Configuration
3. Second Embodiment (Countermeasure against Doppler Shift)
 (1) Existing Configurations
 (2) Method for Setting Control Parameters
 (3) System Configuration
4. Modification Examples
5. Computer Configuration 1. Outline of Existing Standards (Structure of Physical Layer Frame)

Figure 1:
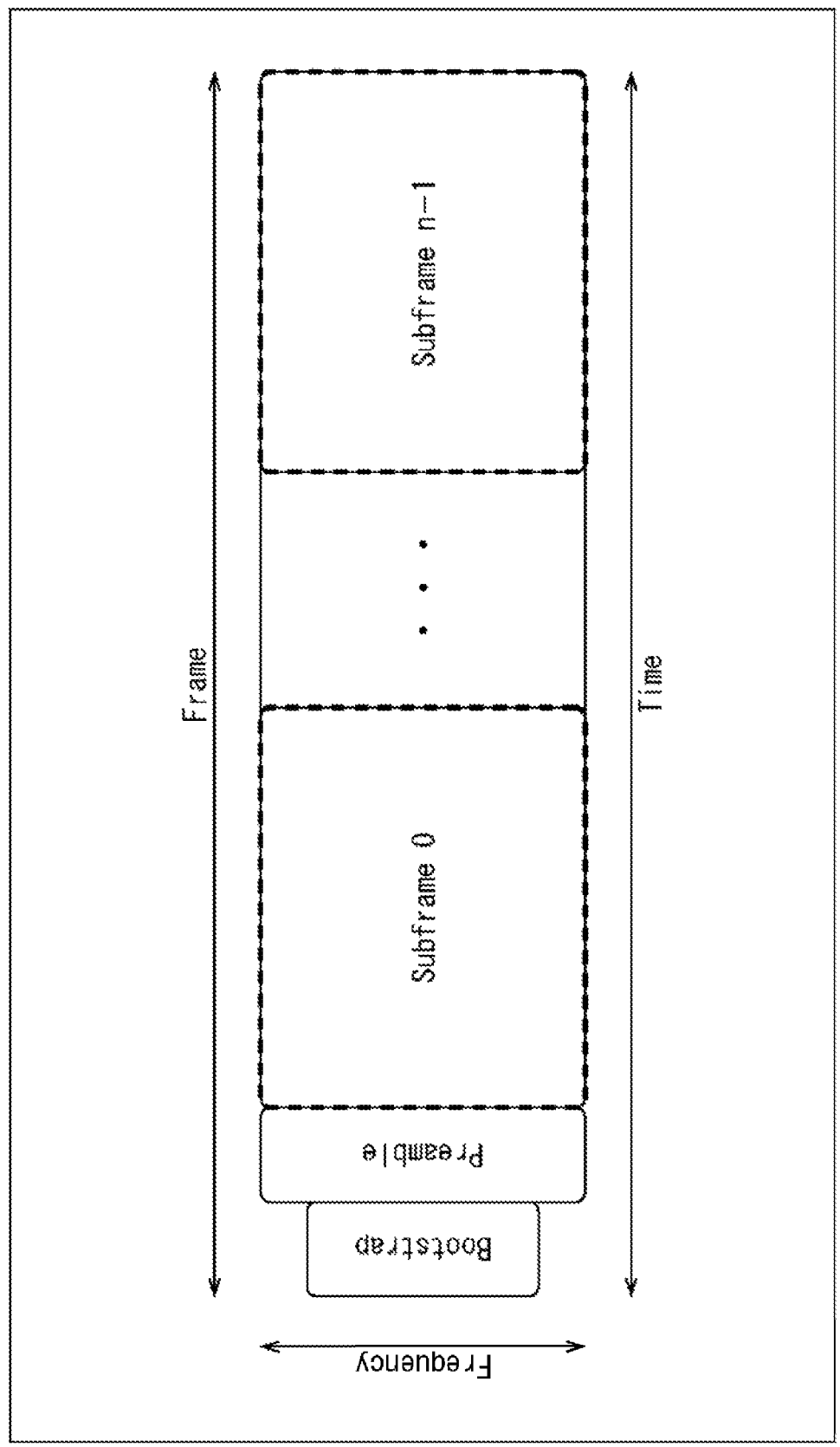
FIG. 1 is a diagram showing the structure of a physical layer frame.

FIG. 1 is a diagram showing the structure of a physical layer frame. In FIG. 1, the horizontal direction represents time, and the vertical direction represents frequency.

The physical layer frame is defined as a unit for transmitting data. For example, a physical layer frame defined by ATSC 3.0 is constituted by a bootstrap, a preamble and one or more subframes. The physical layer frame is constituted with a predetermined frame length such as a millisecond unit. In the physical layer frame, it is possible to acquire the subsequent subframe after acquiring the bootstrap and the preamble.

The bootstrap corresponds to, for example, a P1 symbol constituting a T2 frame of digital video broadcasting-second generation terrestrial (DVB-T2), and the preamble corresponds to, for example, a P2 symbol constituting the T2 frame of DVB-T2. Therefore, the bootstrap can be said to be also a preamble.

The preamble can include L1 signaling such as L1 basic information (L1-Basic) and L1 detailed information (L1-Detail). Herein, in comparison between the L1 basic information and the L1 detailed information, their sizes are different, in which the L1 basic information is constituted by bits of about 200 bits, and the L1 detailed information is constituted by 400 to several thousand bits. Moreover, since the L1 basic information and the L1 detailed information are read out in this order in the preamble, the L1 basic information is read out earlier than the L1 detailed information. Furthermore, the L1 basic information is also different from the L1 detailed information in that the L1 basic information is transmitted more robustly (robustness).

A payload (data) is arranged in the subframe. In a case where two or more subframes are included in the physical layer frame, for example, various control parameters such as FFT size, pilot pattern, guard interval length and the like can be changed for each subframe.

Incidentally, in the existing ATSC 3.0, control parameters such as FFT size, pilot pattern and the like can be freely set for the subframe included in the physical layer frame according to use. However, in a case where these control parameters are freely set, the influences of the multipath propagation and the Doppler shift are received in some cases.

Herein, the multipath propagation is a phenomenon such as reflection and the like caused by having two or more propagation paths when a radio signal propagates through space. Moreover, the Doppler shift is a phenomenon in which the frequency of a radio wave changes according to the relative positions of a generation source of a radio signal (sender) and a receiver (especially a mobile receiver) which receives that radio signal.

In the present technology, a technology for suppressing the influence of the multipath propagation and the Doppler shift by appropriately setting control parameters set for a subframe included in a physical layer frame is proposed. Hereinafter, the countermeasures against the multipath propagation will be described as a first embodiment, and the countermeasures against the Doppler shift will be described as a second embodiment.

2. First Embodiment

As described above, the control parameters such as FFT size, pilot pattern and the like can be arbitrarily set for each of one or more subframes included in the physical layer frame. For example, in ATSC 3.0, three kinds of FFT sizes, 8K, 16K and 32K can be set for each subframe. Moreover, as the pilot pattern, it is possible to set an interval period Dx=3 in a frequency direction where the pilot signal exists, an interval period Dy=2 in a time direction, and the like.

If such control parameters for each subframe are freely set, the influence of the multipath propagation cannot be suppressed in some cases. Therefore, the multipath propagation resistance is demanded to be enhanced by appropriately setting the control parameters for each subframe. Hereinafter, a receiving apparatus according to the present technology will be described after an existing receiving apparatus is described.

Figure 2:
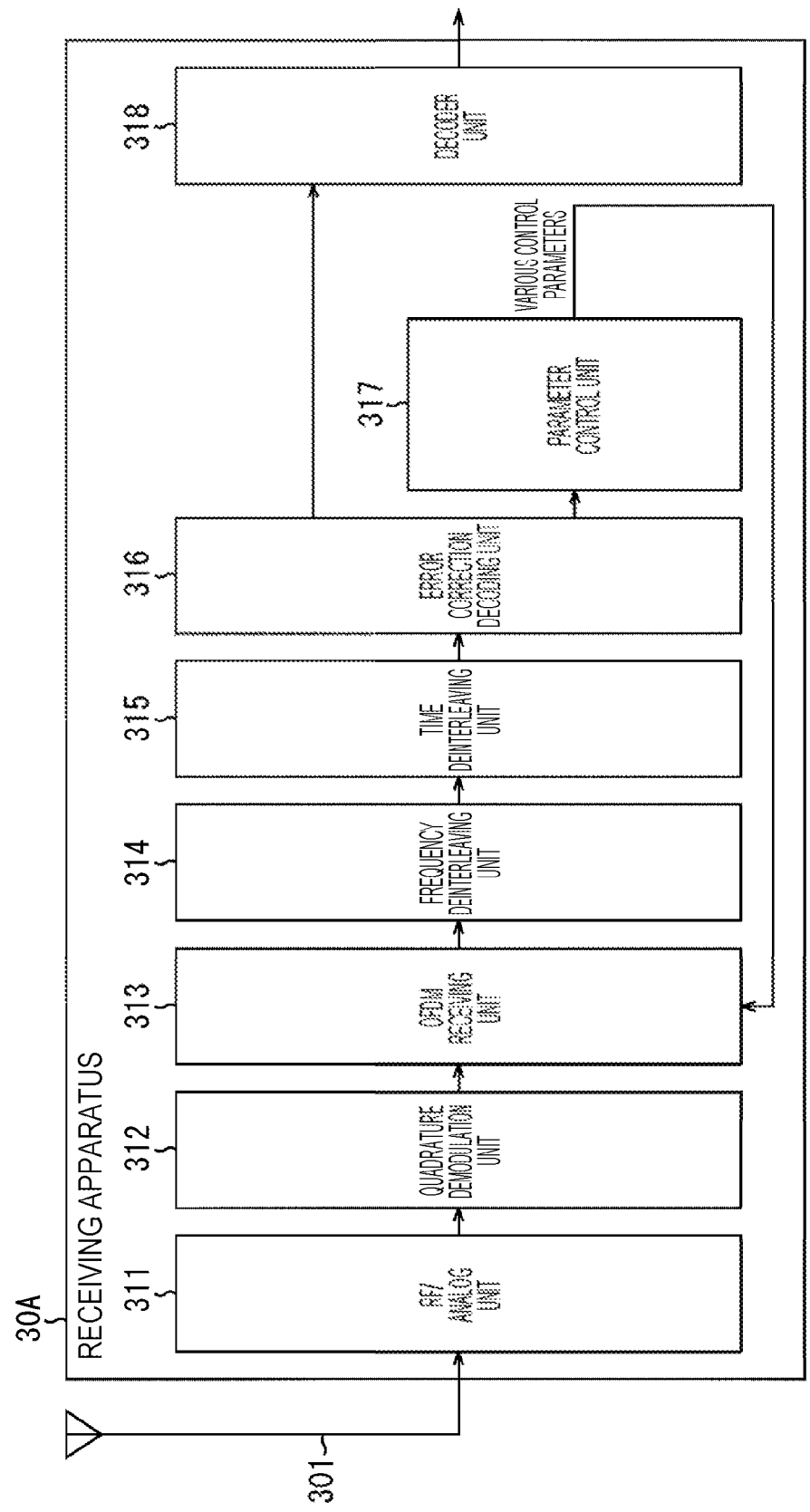
FIG. 2 is a diagram showing the configuration of an existing receiving apparatus.

(1) Existing Configurations
(Configuration of Existing Receiving Apparatus)
FIG. 2 is a diagram showing the configuration of an existing receiving apparatus 30A.

In FIG. 2, the receiving apparatus 30A includes an RF/analog unit 311, a quadrature demodulation unit 312, an OFDM receiving unit 313, a frequency deinterleaving unit 314, a time deinterleaving unit 315, an error correction decoding unit 316, a parameter control unit 317 and a decoder unit 318.

The RF/analog unit 311 is connected to an antenna 301, receives and processes an RF signal sent from a sending apparatus via a transmission line, and supplies the signal to the quadrature demodulation unit 312. Note that the signal processed by the RF/analog unit 311 is subjected to analog/digital (A/D) conversion processing, converted into a digital signal from an analog signal, and then inputted into the quadrature demodulation unit 312.

The quadrature demodulation unit 312 orthogonally demodulates the signal supplied from the RF/analog unit 311 and supplies a baseband orthogonal frequency division multiplexing (OFDM) signal obtained as a result to the OFDM receiving unit 313.

The OFDM receiving unit 313 performs a fast Fourier transform (FFT) operation on the OFDM signal supplied from the quadrature demodulation unit 312, extracts data being orthogonally modulated to each subcarrier, and supplies the extracted data to the frequency deinterleaving unit 314. Note that the detailed configuration of the OFDM receiving unit 313 will be described later with reference to FIG. 3.

The frequency deinterleaving unit 314 deinterleaves the data supplied from the OFDM receiving unit 313 in the frequency direction and supplies the data deinterleaved in the frequency direction to the time deinterleaving unit 315.

The time deinterleaving unit 315 deinterleaves the data supplied from the frequency deinterleaving unit 314 in the time direction and supplies the data deinterleaved in the time direction to the error correction decoding unit 316.

The error correction decoding unit 316 performs error correction processing (e.g., low density parity check (LDPC) decoding, BCH decoding or the like) on the data supplied from the time deinterleaving unit 315. Among the data after the error correction, the error correction decoding unit 316 supplies the data of the preamble to the parameter control unit 317 as well as supplies the data of the subframe to the decoder unit 318.

The parameter control unit 317 processes the data supplied from the error correction decoding unit 316 and supplies various control parameters included in the L1 signaling to each unit (e.g., the OFDM receiving unit 313 and the like) of the receiving apparatus 30. Thus, processing using various control parameters is performed in each unit of the receiving apparatus 30.

The decoder unit 318 decodes the data (of the subframe) supplied from the error correction decoding unit 316 and outputs the data to a subsequent circuit (not shown).

Figure 3:
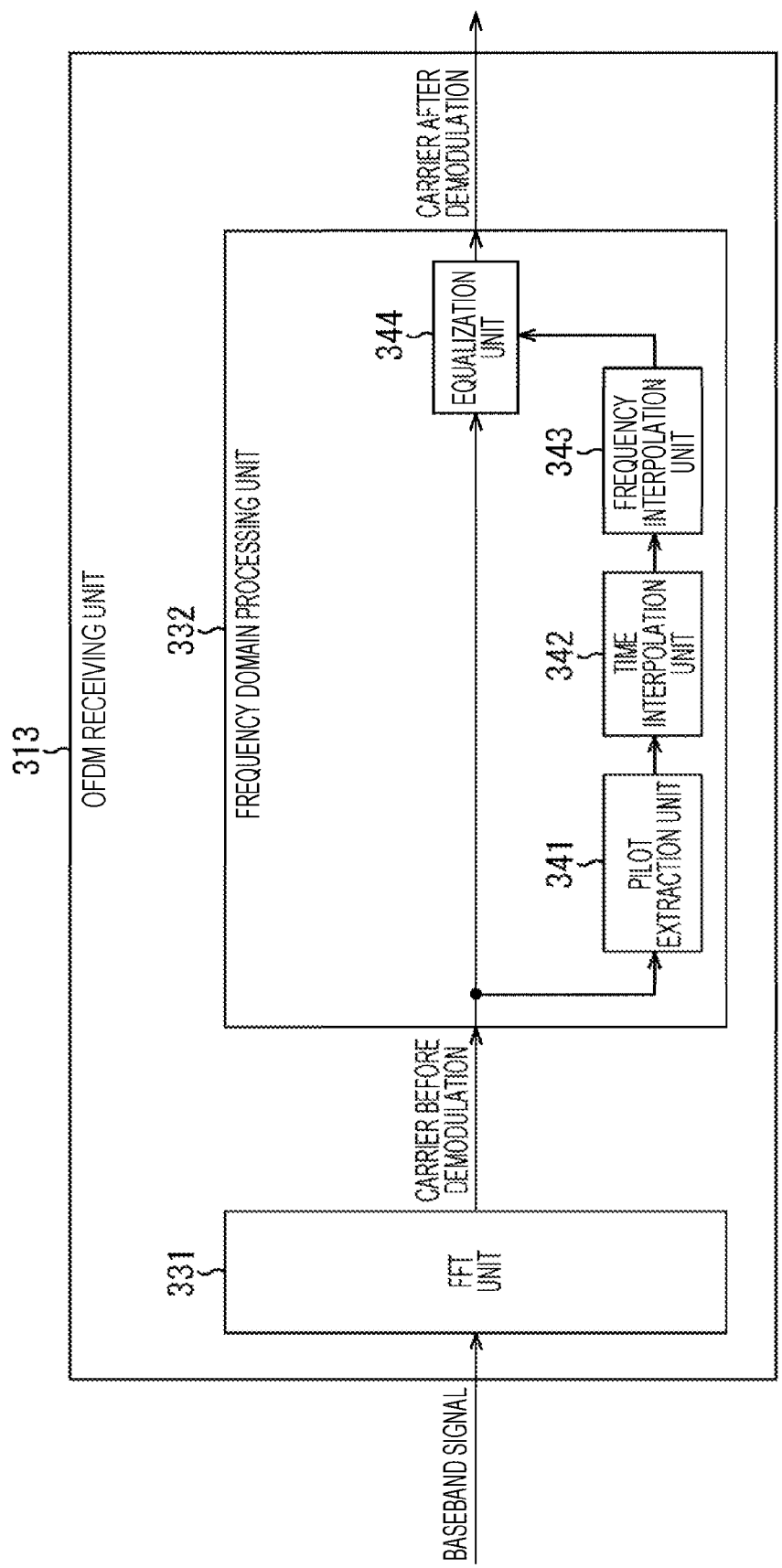
FIG. 3 is a diagram showing the configuration of an existing OFDM receiving unit.

(Configuration of Existing OFDM Receiving Unit)
FIG. 3 is a diagram showing the configuration of the OFDM receiving unit 313 in FIG. 2.

In FIG. 3, the OFDM receiving unit includes an FFT unit 331 and a frequency domain processing unit 332.

The baseband signal (OFDM signal) inputted from the quadrature demodulation unit 312 (FIG. 2) is inputted into the FFT unit 331. Note that, since this baseband OFDM signal is a signal in the time domain before the FFT operation is performed, the signal in the time domain before the FFT operation is performed will be referred to as an OFDM time domain signal in the following description.

The FFT unit 331 performs the FFT operation on the OFDM time domain signal as a baseband signal, extracts data being orthogonally modulated to each subcarrier, and supplies the extracted data to the frequency domain processing unit 332. Note that, since the signal outputted from this FFT unit 331 is a signal in the frequency domain after the FFT operation is performed, the signal after the FFT operation is performed is referred to as an OFDM frequency domain signal in the following description.

The frequency domain processing unit 332 performs predetermined frequency domain processing (e.g., equalization processing or the like) on the OFDM frequency domain signal supplied from the FFT unit 331 and supplies data thereby obtained to the subsequent frequency deinterleaving unit 314 (FIG. 2).

The frequency domain processing unit 332 includes a pilot extraction unit 341, a time interpolation unit 342, a frequency interpolation unit 343 and an equalization unit 344.

The pilot extraction unit 341 extracts a pilot signal from the OFDM frequency domain signal from the FFT unit 331 and supplies the pilot signal to the time interpolation unit 342.

Herein, the pilot signal is a known signal (a signal known by the receiving apparatus 30A side) and discretely inserted in the time direction and the frequency direction in the OFDM. Then, in the receiving apparatus 30A, this pilot signal is used for the synchronization and the estimation of the transmission line characteristics. Note that, for example, there are pilot signals called a scattered pilot (SP) and a continual pilot (CP) for the pilot signal.

The time interpolation unit 342 performs interpolation in the time direction using the pilot signal supplied from the pilot extraction unit 341 in the time direction (symbol direction) and supplies time direction interpolation data, which is the data after the interpolation, to the frequency interpolation unit 343.

The frequency interpolation unit 343 performs filtering for interpolating the time direction interpolation data supplied from the time interpolation unit 342 in the frequency direction and supplies frequency direction interpolation data (transmission line characteristic data), which is the data interpolated in the frequency direction, to the equalization unit 344.

The equalization unit 344 targets the OFDM frequency domain signal supplied from the FFT unit 331 and performs distortion correction for correcting the amplitude and phase distortion received by the subcarrier of the OFDM signal on the transmission line by using the frequency direction interpolation data (transmission line characteristic data) supplied from the frequency interpolation unit 343. The equalization unit 344 supplies the OFDM frequency domain signal after the distortion correction to the subsequent frequency deinterleaving unit 314 (FIG. 2).

(Principle of OFDM Demodulation)

Herein, the principle of the OFDM demodulation executed by the OFDM receiving unit 313 or the like in FIG. 2 will be described.

In orthogonal frequency division multiplexing (OFDM), a large number of orthogonal subcarriers are provided in the transmission band, and digital modulation which allocates data to the amplitude and phase of each of the subcarriers, such as phase shift keying (PSK), quadrature amplitude modulation (QAM) or the like, is performed.

In the OFDM, since the transmission band is divided by the large number of subcarriers, a band per subcarrier (one wave) is narrow, and the modulation rate is slow. However, the total transmission rate (subcarriers as a whole) is not different from that of the conventional modulation method.

As described above, since the data is allocated to the plurality of subcarriers in the OFDM, the modulation can be performed by an inverse fast Fourier transform (IFFT) operation which performs inverse Fourier transform. Moreover, the demodulation of the OFDM signal obtained as a result of the modulation can be performed by a fast Fourier transform operation which performs Fourier transform. Therefore, the sending apparatus which sends the OFDM signal can be configured by using a circuit which performs the IFFT operation, and the receiving apparatus which receives the OFDM signal can be configured by using a circuit which performs the FFT operation.

Furthermore, in the OFDM, the resistance against the multipath propagation can be enhanced by providing signal sections called guard intervals (GI) described later. Further, in the OFDM, as described above, the pilot signal, which is a known signal, is discretely inserted in the time direction and the frequency direction and used for the synchronization and the estimation of the transmission line characteristics.

Since the OFDM is highly resistant to the multipath propagation, the OFDM is adopted in terrestrial digital broadcasting or the like which is highly influenced by multipath propagation interference. As terrestrial digital broadcast standards adopting the OFDM, for example, there are digital video broadcasting-terrestrial (DVB-T), integrated services digital broadcasting-terrestrial (ISDB-T) and the like besides ATSC 3.0

(OFDM Demodulation in Case where Interval Period Dx=6)

Figure 4:
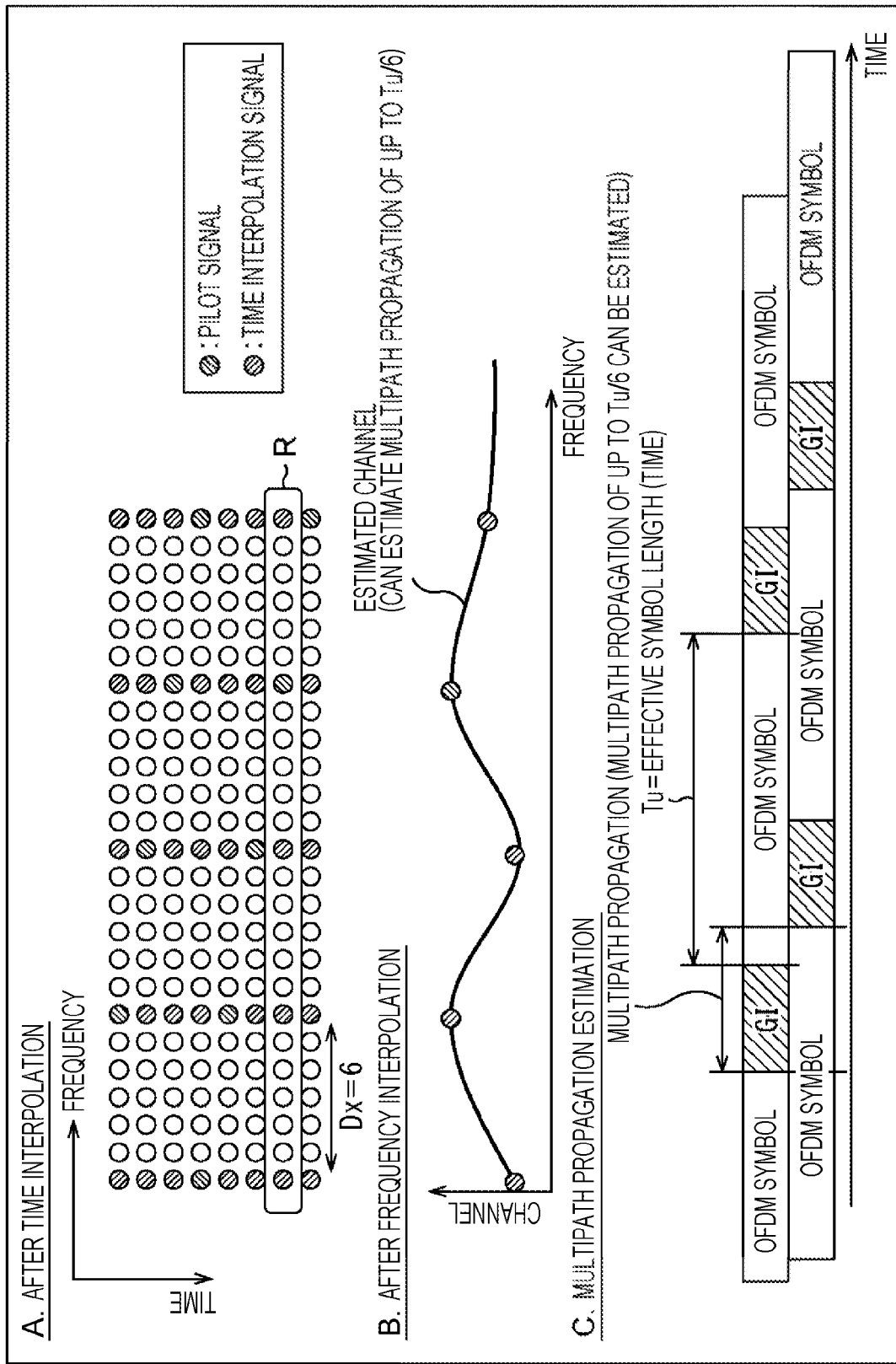
FIG. 4 is a diagram for explaining the principle of OFDM demodulation.

FIG. 4 is a diagram for explaining the OFDM demodulation in a case where an interval period Dx in the frequency direction in which the pilot signal exists is set to six.

A of FIG. 4 is a diagram showing time direction interpolation data obtained by the interpolation in the time direction by the time interpolation unit 342 (FIG. 3). Note that the horizontal direction (row direction) represents the frequency direction and the vertical direction (column direction) represents the time direction (symbol direction) in A of FIG. 4.

In the OFDM, the data is sent (transmitted) in units called OFDM symbols. Circles in A of FIG. 4 are transmission symbols constituting the OFDM symbols, and the physical layer frame is constituted by a plurality of OFDM symbols.

In A of FIG. 4, (the transmission symbol of) the pilot signal is arranged at a plurality of predetermined positions of the OFDM signals. That is, in A of FIG. 4, (the transmission symbol of) the pilot signal is arranged for every one OFDM symbol in the time direction and arranged for every six subcarriers in the frequency direction. That is, if the interval in the frequency direction in which the pilot signal exists (column interval) is set as the interval period Dx, the interval period Dx=6 in A of FIG. 4.

From the OFDM signal in which the pilot signal is arranged with the interval period Dx=6 shown in A of FIG. 4 by the interpolation in the time direction in the time interpolation unit 342 (FIG. 3), an estimated value (time interpolation signal in A of FIG. 4) of the transmission line characteristics for every six transmission symbols in the frequency direction can be obtained for each OFDM symbol.

B of FIG. 4 is a diagram showing the frequency direction interpolation data obtained by the interpolation in the frequency direction by the frequency interpolation unit 343 (FIG. 3), that is, the estimated value (transmission line characteristic data) obtained by estimating the transmission line characteristics for each transmission symbol (each subcarrier) of the OFDM symbol. Note that the horizontal direction represents the frequency direction and the vertical direction represents the channel in B of FIG. 4.

The waveform in B of FIG. 4 is the estimated channel. That is, this estimated channel is equivalent to the frequency direction interpolation data, which is the estimated values of the transmission line characteristics interpolated in the frequency direction and obtained by using the time direction interpolation data, which is the estimated values of the transmission line characteristics of the transmission symbols enclosed by a frame R in A of FIG. 4. The estimated channel in B of FIG. 4 can estimate multipath propagation of up to Tu/6 since the interval period Dx=6 of the pilot signals in the frequency direction in the frame R in A of FIG. 4.

Herein, Tu (second) is an effective symbol length. Moreover, Tu/Dx is a multipath propagation length which can be handled by the estimated channel. For example, in a case where the interval period Dx=6 of the pilot signals in the frequency direction, it is possible to estimate multipath propagation of up to Tu/6.

As shown in C of FIG. 4, the resistance against the multipath propagation is enhanced by providing the guard intervals (GI) at the heads of the OFDM symbols in the OFDM. However, the effective symbol length of the OFDM symbol, that is, the length not including the guard interval (GI) is Tu (second), and it is possible to estimate multipath propagation of up to Tu/6 in this example. However, with multipath propagation exceeding the length of the guard interval (GI), interference between the OFDM symbols occurs, and a noise component caused by this interference appears.

That is, in the OFDM demodulation in FIG. 4, the interval period Dx=6 of the pilot signals in the frequency direction is set (A of FIG. 4), and the multipath propagation of up to Tu/6 can be estimated by the estimated channel (B of FIG. 4). Thus, it can be said that the interval period Dx of the pilot signals in the frequency direction is short and the range of the multipath propagation length which can be handled by the estimated channel is wide as compared with the OFDM demodulation in a case where the interval period Dx=12 is set in FIG. 5 described later.

(OFDM Demodulation in Case where Interval Period Dx=12)

Figure 5:
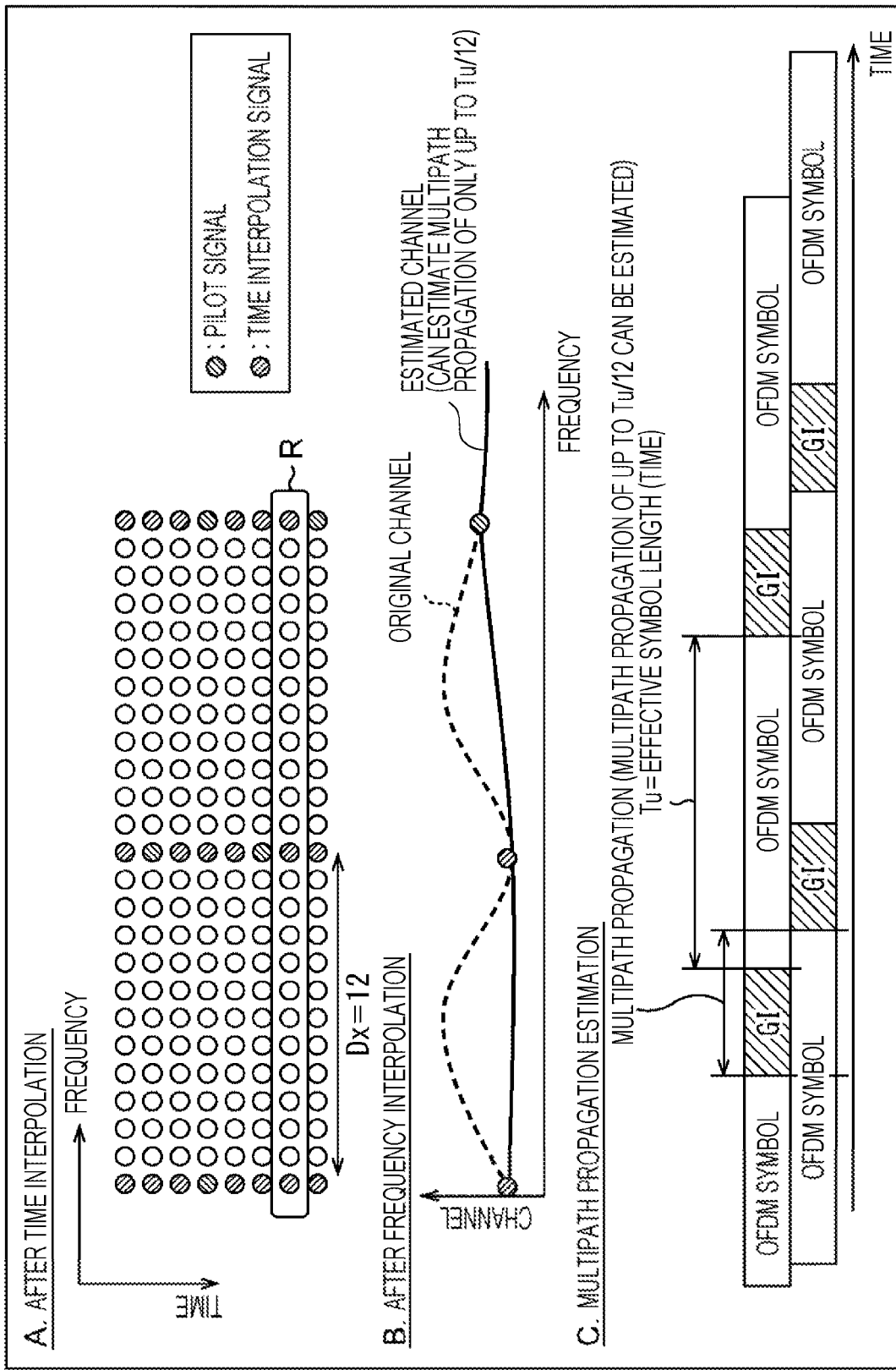
FIG. 5 is a diagram for explaining the principle of OFDM demodulation.

FIG. 5 is a diagram for explaining the OFDM demodulation in a case where the interval period Dx in the frequency direction in which the pilot signal exists is set to 12.

The OFDM demodulation in FIG. 5 is different from the OFDM demodulation in FIG. 4 described above in that the interval period Dx of the pilot signals in the frequency direction changes to 12 from 6.

Like A of FIG. 4, A of FIG. 5 shows the time direction interpolation data obtained by the interpolation in the time direction by the time interpolation unit 342 (FIG. 3). However, the interval period Dx=12 of the pilot signals in the frequency direction, an estimated value of the transmission line characteristics for every 12 transmission symbols in the frequency direction can be obtained for each OFDM symbol.

Moreover, like B of FIG. 4, B of FIG. 5 shows the frequency direction interpolation data obtained by the interpolation in the frequency direction by the frequency interpolation unit 343 (FIG. 3). The estimated channel is equivalent to the frequency direction interpolation data obtained by using the time direction interpolation data which is the estimated values of the transmission line characteristics of the transmission symbols enclosed by a frame R in A of FIG. 5. Since the interval period Dx=12 of the pilots in the frequency direction in the frame R in A of FIG. 5, the estimated channel in B of FIG. 5 has a linear waveform milder than the waveform of the original channel indicated by the dotted line in the drawing.

Therefore, as shown in C of FIG. 5, the estimated channel in B of FIG. 5 can estimate multipath propagation of only up to Tu/12. That is, in the OFDM demodulation in FIG. 5, the interval period Dx of the pilot signals in the frequency direction is set to 12 (A of FIG. 5), and the multipath propagation of only up to Tu/12 can be estimated by the estimated channel (B of FIG. 5). Therefore, it can be said that the interval period Dx of the pilot signals in the frequency direction is long and the range of the multipath propagation length which can be handled by the estimated channel is narrow as compared with the OFDM demodulation in the case the interval period Dx=6 is set in FIG. 4 described above.

Note that, in the following description, the pilot pattern in which the interval period Dx of the pilot signals in the frequency direction is short and the density of the pilot signals is high is expressed as "dense" in the distribution of the pilot signals, while the pilot pattern in which the interval period Dx of the pilot signals in the frequency direction is long and the density of the pilot signals is low is expressed as "sparse" in the distribution of the pilot signals. Thus, the pilot patterns are distinguished. Therefore, among the arrangement patterns of the pilot signals shown in A of FIG. 4 and A of FIG. 5 described above, it can be said that the arrangement pattern in A of FIG. 4 is "dense" in the distribution of the pilot signals. On the other hand, it can be said that the arrangement pattern in A of FIG. 5 is "sparse" in the distribution of the pilot signals.

(Examples of Parameter Setting for Each Subframe)

Figure 6:
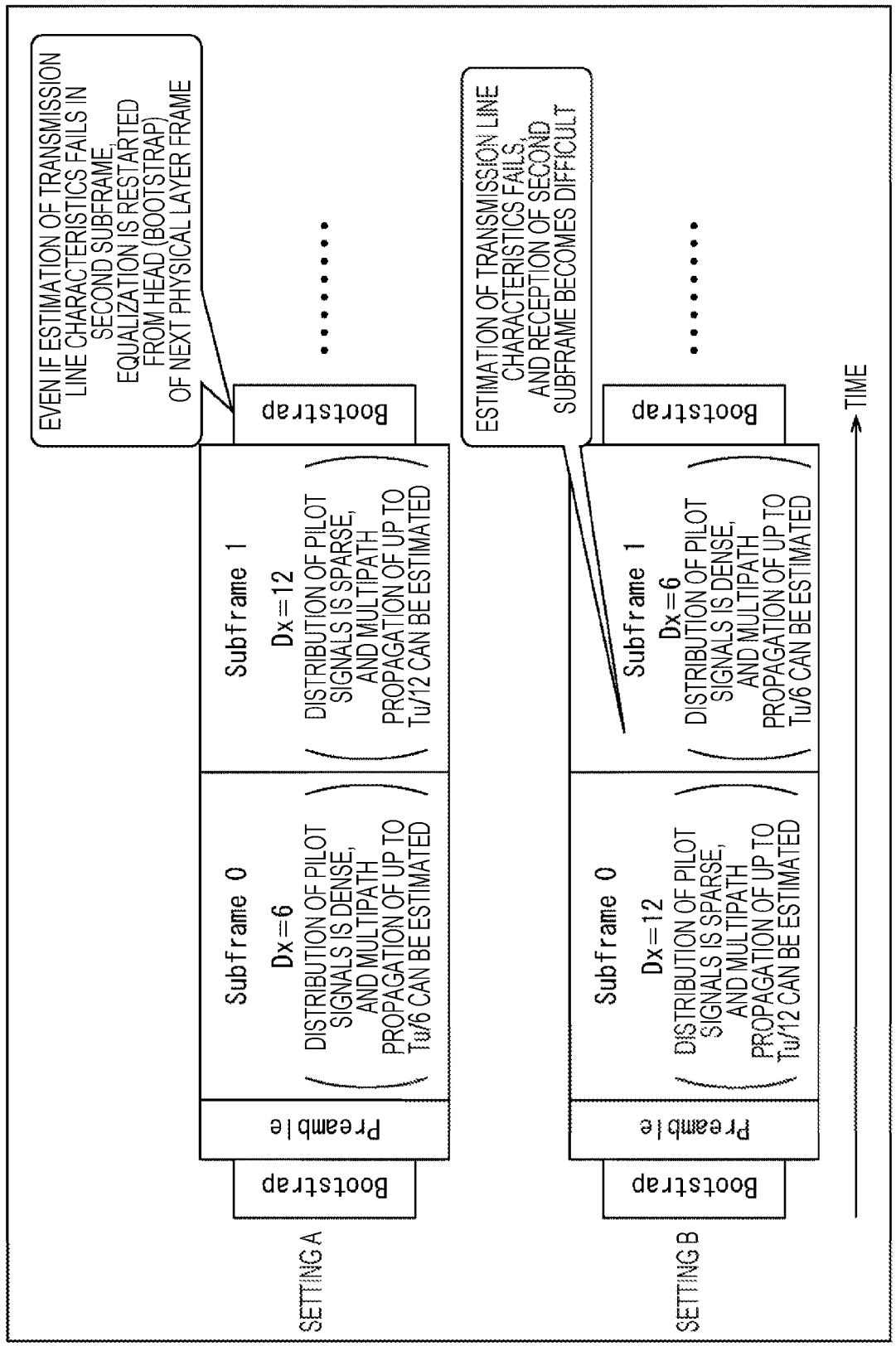
FIG. 6 is a diagram showing examples of subframe setting.

As described above, the control parameters such as FFT size and pilot pattern can be arbitrarily set for each of one or more subframes of the physical layer frame. In FIG. 6, setting A (Config A) and setting B (Config B) are shown as examples of the control parameter settings for each subframe.

In the setting A in FIG. 6, in a case where the physical layer frame includes two subframes, six is set as the interval period Dx of the pilot signals in the frequency direction for the head subframe (Subframe 0), and 12 is set as the interval period Dx of the pilot signals in the frequency direction for the second subframe (Subframe 1).

In the case of this setting A, the distribution of the pilot signals is dense and multipath propagation of up to Tu/6 can be estimated in the head subframe, whereas the distribution of the pilot signals is sparse and multipath propagation of up to Tu/12 can be estimated in the second subframe. Therefore, in the case of the setting A, it is unlikely to fail the estimation of the transmission line characteristics (channel estimation) in the head subframe. Even if the estimation of the transmission line characteristics fails in the second subframe, it is possible to restart the equalization processing from the bootstrap arranged at the head of the next physical layer frame.

Note that, since all carriers are known signal sequences (i.e., all carriers can be said to be pilot signals) in the bootstrap, even if the estimation of the transmission line characteristics fails in the current physical layer frame, it is possible to securely restart the equalization processing from the bootstrap arranged at the head of the next physical layer frame.

On the other hand, in the setting B in FIG. 6, contrary to the setting A in FIG. 6, 12 is set as the interval period Dx of the pilot signals in the frequency direction for the head subframe, and six is set as the interval period Dx of the pilot signals in the frequency direction for the second subframe.

In the case of this setting B, the distribution of the pilot signals is sparse and multipath propagation of up to Tu/12 can be estimated in the head subframe, whereas the distribution of the pilot signals is dense and multipath propagation of up to Tu/6 can be estimated in the second subframe. Therefore, in the case of the setting B, it is likely to fail the estimation of the transmission line characteristics in the head subframe. If the estimation of the transmission line characteristics fails in the head subframe, the reception of the second subframe becomes difficult. Note that, even in this case, the equalization processing can be restarted from the bootstrap at the head of the next physical layer frame.

This phenomenon is caused because, in a case where the setting A and the setting B in FIG. 6 are compared, the subframe with a wide range of the multipath propagation length which can be handled by the estimation of the transmission line characteristics is arranged at the head in the setting A so that it is unlikely to fail the estimation of the transmission line characteristics in the head subframe, whereas the subframe with a narrow range of the multipath propagation length which can be handled by the estimation of the transmission line characteristics is arranged at the head in the setting B so that it is likely to fail the estimation of the transmission line characteristics in the head subframe.

Moreover, in the setting A, the subframe with a narrow range of the multipath propagation length which can be handled by the estimation of the transmission line characteristics is arranged second, that is, arranged at a position near the bootstrap of the next physical layer frame. Thus, even if the estimation of the transmission line characteristics fails in the second subframe, it is possible to restart the equalization processing from the bootstrap arranged at the head of the immediately next physical layer frame. On the other hand, in the setting B, if the estimation of the transmission line characteristics fails in the head subframe, the reception of the second subframe becomes difficult.

In other words, in the setting A, the distribution of the pilot signals is "dense" in the head subframe, the distribution of the pilot signals is "sparse" in the second subframe, and the distribution of the pilot signals changes from "dense" to "sparse" by each subframe. On the other hand, in the setting B, the distribution of the pilot signals is "sparse" in the head subframe, the distribution of the pilot signals is "dense" in the second subframe, and the distribution of the pilot signals changes from "sparse" to "dense" by each subframe.

Herein, with reference to FIGS. 7 to 10, the interpolation in the time direction for the physical layer frame compatible with the setting A and the setting B in FIG. 6 will be described in more detail. However, there are cases where the interval of the arrangements of pilot signals in the frequency direction is an integral multiple and a non-integral multiple in the pilot pattern. Herein, both patterns are described for the setting A and the setting B.

In the following description, of the setting A in which the distribution of the pilot signals changes from "dense" to "sparse," a setting in which the interval of the arrangements of the pilot signals in the frequency direction is an integral multiple is referred to as a setting A-1, and a setting in which the interval of the arrangements of the pilot signals in the frequency direction is a non-integral multiple is referred to as a setting A-2. Moreover, of the setting B in which the pilot signals change from "sparse" to "dense," a setting in which the interval of the arrangements of the pilot signals in the frequency direction is an integral multiple is referred to as a setting B-1, and a setting in which the interval of the arrangements of the pilot signals in the frequency direction is a non-integral multiple is referred to as a setting B-2.

(Setting A-1: "Dense"→"Sparse," "Integral Multiple")

Figure 7:
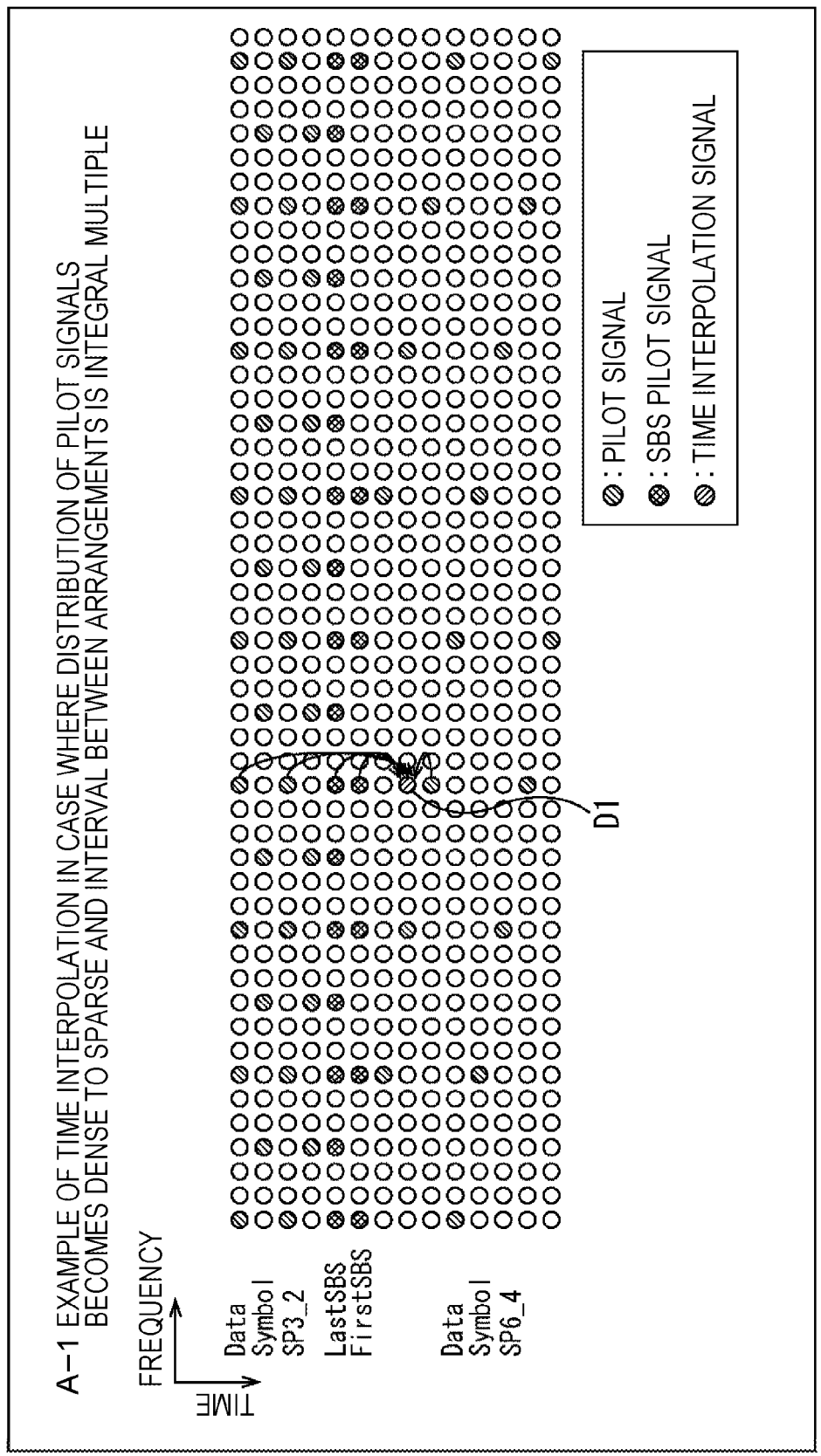
FIG. 7 is a diagram showing an example of time interpolation in a case where the distribution of the pilot signals becomes dense to sparse and the interval between the arrangements of the pilot signals is an integral multiple.

FIG. 7 is a diagram showing an example of time interpolation in a case where the distribution of the pilot signals becomes dense to sparse and the interval between the arrangements of the pilot signals is an integral multiple. Like A of FIG. 4 and A of FIG. 5 previously mentioned, a plurality of transmission symbols indicated by circles in the drawing are arranged in a region indicated by the frequency direction and the time direction in FIG. 7. Note that these relationships are also similar in FIGS. 8 to 10 described later.

In FIG. 7, "Data Symbol SP3_2" and "Data Symbol SP6_4" are the distributions of the pilot signals for the data symbols, and the numerals following "SP" are the interval periods Dx in the frequency direction and the interval periods Dy in the time direction of the pilot signals, respectively. For example, "SP3_2" means the interval period Dx=3 in the frequency direction and the interval period Dy=2 in the time direction of the pilot signals. Moreover, for example, "SP6_4" means the interval period Dx=6 in the frequency direction and the interval period Dy=4 in the time direction of the pilot signals.

Moreover, SBS of "FirstSBS" and "LastSBS" is an abbreviation of subframe boundary symbol, and "FirstSBS" and "LastSBS" are symbols inserted at the beginning and the end of the subframe, respectively. The pilot signals (SBS pilot signals) are inserted every predetermined interval periods Dx in FirstSBS and LastSBS, and the densities thereof are higher than those of the pilot signals for the data symbols.

That is, in FIG. 7, in a case where the upper subframe including LastSBS (e.g., the head subframe) and the lower subframe including FirstSBS (e.g., the second subframe) are considered separately with LastSBS and FirstSBS as boundaries, the interval period Dx=3 in the frequency direction in which the pilot signal exists and the interval period Dy=2 in the time direction in the upper subframe. On the other hand, the interval period Dx=6 in the frequency direction in which the pilot signal exists and the interval period Dy=4 in the time direction in the lower subframe.

As described above, in the setting A-1, the distribution of the pilot signals changes from "dense" to "sparse" as can be seen from the comparison between the distribution of the pilot signals included in the upper subframe temporally earlier (e.g., the head subframe) and the distribution of the pilot signals included in the lower subframe temporally later (e.g., the second subframe). Furthermore, in terms of the distribution of (the transmission symbols of) the pilot signals arranged in the frequency direction in FIG. 7, (the transmission symbol of) the pilot signal is arranged every three transmission symbols in the frequency direction, and the interval between the arrangements thereof is an integral multiple.

Herein, in terms of a transmission symbol D1 of the lower subframe, as indicated by the arrows in the drawing, the transmission symbol D1 is a time interpolation signal obtained by performing the interpolation in the time direction by using a past pilot signal temporally later and a future pilot signal temporally later. In this example, four past pilot signals are used, but the number of pilot signals of the current subframe (lower subframe) is one, and the remaining three pilot signals are pilot signals obtained from the immediately preceding subframe (upper subframe).

That is, in the setting A-1, when the interpolation in the time direction is performed, the pilot signals of the immediately preceding subframe (subframe with the dense distribution of the pilot signals) at the boundary of the current subframe (subframe with the sparse distribution of the pilot signals) can be directly used plurally. Thus, the equalization performance can be enhanced.

(Setting A-2: "Dense"→"Sparse," "Non-Integral Multiple")

Figure 8:
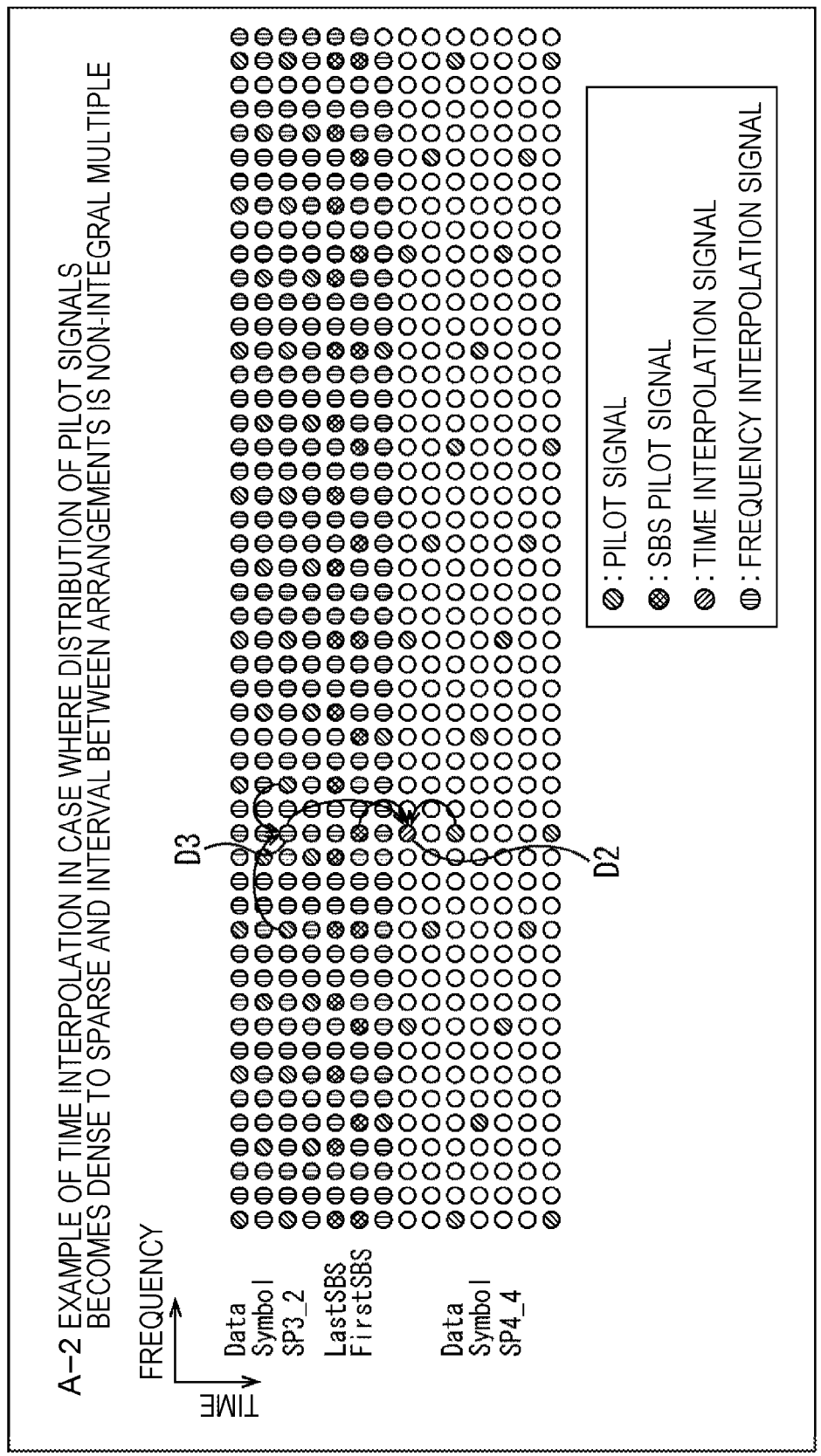
FIG. 8 is a diagram showing an example of time interpolation in a case where the distribution of the pilot signals becomes dense to sparse and the interval between the arrangements of the pilot signals is non-integral multiple.

FIG. 8 is a diagram showing an example of time interpolation in a case where the distribution of the pilot signals becomes dense to sparse and the interval between the arrangements of the pilot signals is non-integral multiple.

Also in FIG. 8, in a case where the upper subframe including LastSBS (e.g., the head subframe) and the lower subframe including FirstSBS (e.g., the second subframe) are considered separately with LastSBS and FirstSBS as boundaries, the interval period Dx=3 in the frequency direction in which the pilot signal exists and the interval period Dy=2 in the time direction in the upper subframe. On the other hand, the interval period Dx=4 in the frequency direction in which the pilot signal exists and the interval period Dy=4 in the time direction in the lower subframe.

As described above, in the setting A-2, the distribution of the pilot signals changes from "dense" to "sparse" like the setting A-1 described above as can be seen from the comparison between the distribution of the pilot signals included in the upper subframe (e.g., the head subframe) and the distribution of the pilot signals included in the lower subframe (e.g., the second subframe).

Moreover, in FIG. 8, in terms of the distribution of (the transmission symbols of) the pilot signals arranged in the frequency direction, (the transmission symbol of) the pilot signal is arranged every three transmission symbols in the frequency direction in the upper subframe, whereas arranged every four transmission symbols in the frequency direction in the lower subframe. In a case where the upper and the lower subframes are commonly considered, the interval between the arrangements thereof is a non-integral multiple.

Herein, in terms of a transmission symbol D2 of the lower subframe, as indicated by the arrows in the drawing, the transmission symbol D2 is a time interpolation signal obtained by performing the interpolation in the time direction by using a past pilot signal and a future pilot signal. In this example, a transmission symbol D3 is used besides the past pilot signal. This transmission symbol D3 is a frequency interpolation signal obtained by performing the interpolation in the frequency direction for the immediately preceding subframe (upper subframe).

That is, since the interval between the arrangements of the pilot signals is a non-integral multiple in the setting A-2, the frequency interpolation signals can be used in the time interpolation for the current subframe (subframe with the sparse distribution of the pilot signals) by feeding back the equalization information after the frequency interpolation of the immediately preceding subframe (subframe with the dense distribution of the pilot signals). At this time, the equalization information after the frequency interpolation of the immediately preceding subframe (subframe with the dense distribution of the pilot signals) at the boundary of the current subframe (subframe with the sparse distribution of the pilot signals) can be used. Thus, the equalization performance can be enhanced.

(Setting B-1: "Sparse"→"Dense," "Integral Multiple")

Figure 9:
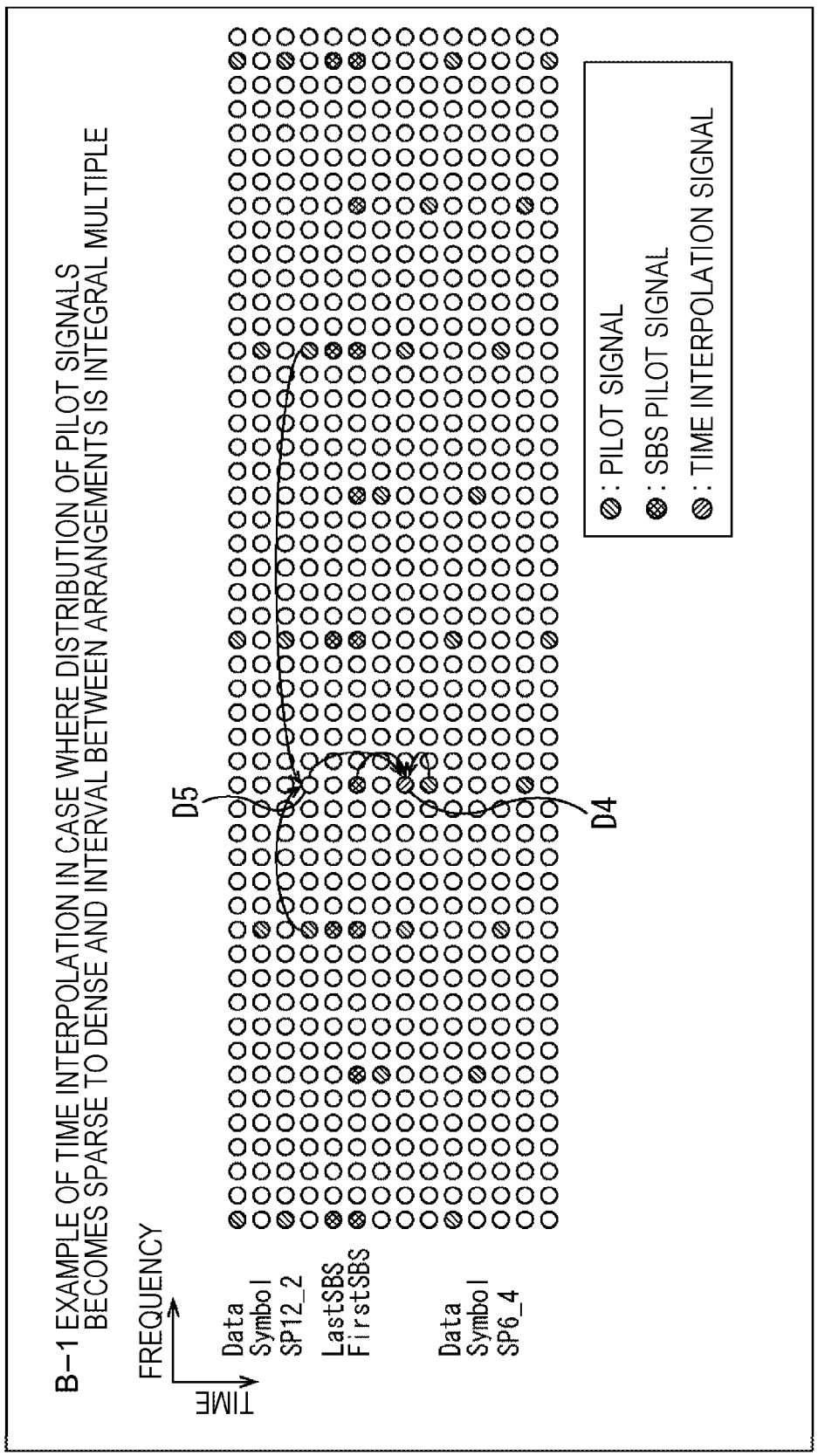
FIG. 9 is a diagram showing an example of time interpolation in a case where the distribution of the pilot signals becomes sparse to dense and the interval between the arrangements of the pilot signals is an integral multiple.

FIG. 9 is a diagram showing an example of time interpolation in a case where the distribution of the pilot signals becomes sparse to dense and the interval between the arrangements of the pilot signals is an integral multiple.

In FIG. 9, in a case where the upper subframe including LastSBS (e.g., the head subframe) and the lower subframe including FirstSBS (e.g., the second subframe) are considered separately with LastSBS and FirstSBS as boundaries, the interval period Dx=12 in the frequency direction in which the pilot signal exists and the interval period Dy=2 in the time direction in the upper subframe. On the other hand, the interval period Dx=6 in the frequency direction in which the pilot signal exists and the interval period Dy=4 in the time direction in the lower subframe.

As described above, in the setting B-1, the distribution of the pilot signals changes from "sparse" to "dense" as can be seen from the comparison between the distribution of the pilot signals included in the upper subframe (e.g., the head subframe) and the distribution of the pilot signals included in the lower subframe (e.g., the second subframe). Moreover, in terms of the distribution of the pilot signals arranged in the frequency direction in FIG. 9, (the transmission symbol of) the pilot signal is arranged every six transmission symbols in the frequency direction, and the interval between the arrangements thereof is an integral multiple.

Herein, in terms of a transmission symbol D4 of the lower subframe, as indicated by the arrows in the drawing, the transmission symbol D4 is a time interpolation signal obtained by performing the interpolation in the time direction by using a past pilot signal and a future pilot signal. In this example, a transmission symbol D5 is used besides the past pilot signal. This transmission symbol D5 is a frequency interpolation signal obtained by performing the interpolation in the frequency direction for the immediately preceding subframe (upper subframe).

That is, in the setting B-1, when the interpolation in the time direction is performed, the pilot signal of the immediately preceding subframe (subframe with the sparse distribution of the pilot signals) at the boundary of the current subframe (subframe with the dense distribution of the pilot signals) is used. However, the distribution of the pilot signals included in the immediately preceding subframe is sparse. Thus, a plurality of points of past pilot signals cannot be used in some cases. Therefore, the equalization performance cannot be enhanced.

Furthermore, even if the points are increased by feeding back the equalization information after the frequency interpolation of the immediately preceding subframe (subframe with the sparse distribution of the pilot signals) to use the frequency interpolation signals in the time interpolation for the current subframe (subframe with the dense distribution of the pilot signals) besides the past pilot signals, the equalization information is obtained from the immediately preceding subframe with more sparse distribution of the pilot signals than the current subframe in conclusion. Thus, the reliability thereof cannot be guaranteed.

(Setting B-2: "Sparse"→"Dense," "Non-Integral Multiple")

Figure 10:
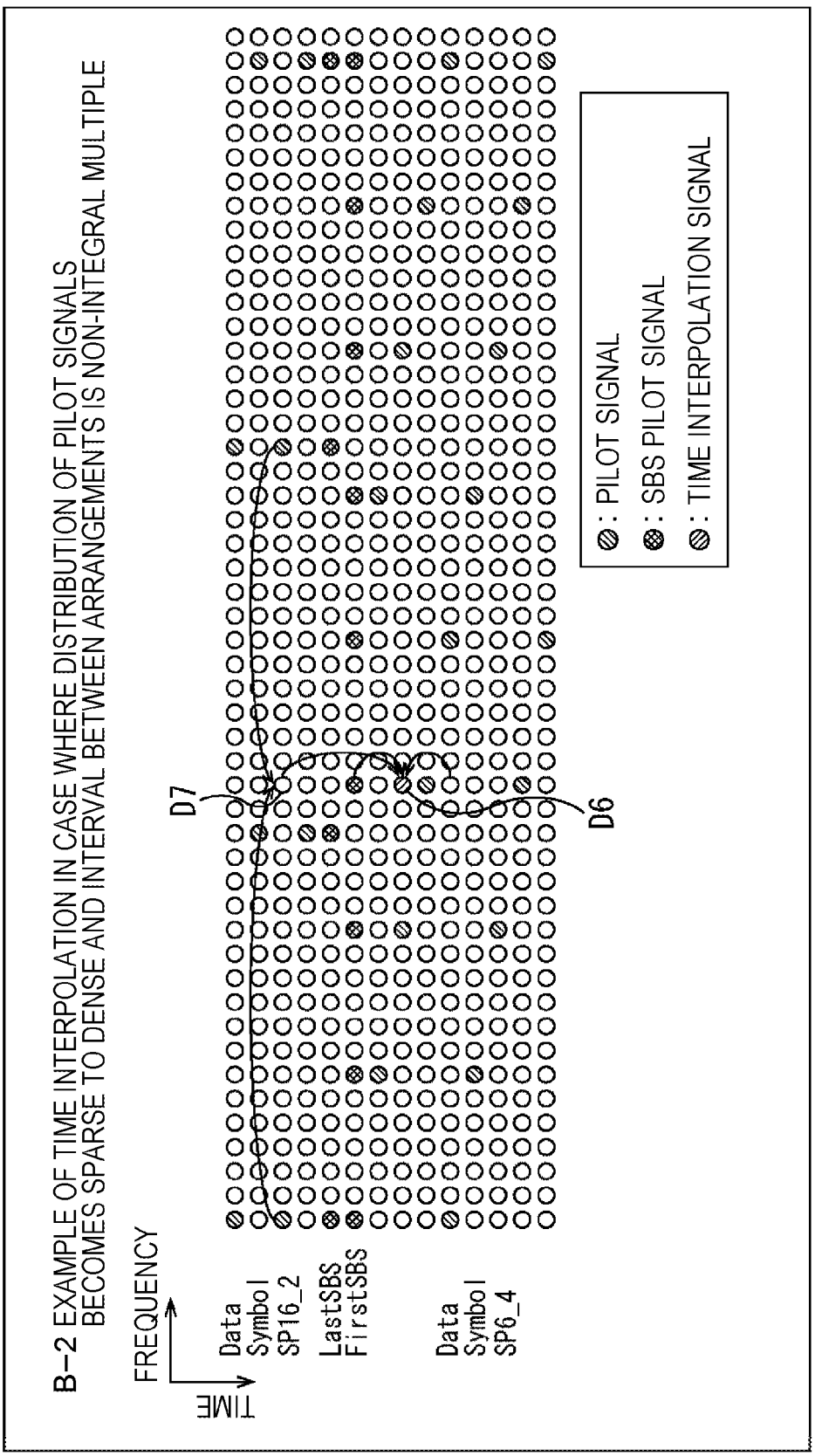
FIG. 10 is a diagram showing an example of time interpolation in a case where the distribution of the pilot signals becomes sparse to dense and the interval between the arrangements of the pilot signals is a non-integral multiple.

FIG. 10 is a diagram showing an example of time interpolation in a case where the distribution of the pilot signals becomes sparse to dense and the interval between the arrangements of the pilot signals is a non-integral multiple.

Also in FIG. 10, in a case where the upper subframe including LastSBS (e.g., the head subframe) and the lower subframe including FirstSBS (e.g., the second subframe) are considered separately with LastSBS and FirstSBS as boundaries, the interval period Dx=16 in the frequency direction in which the pilot signal exists and the interval period Dy=2 in the time direction in the upper subframe. On the other hand, the interval period Dx=6 in the frequency direction in which the pilot signal exists and the interval period Dy=4 in the time direction in the lower subframe.

As described above, in the setting B-2, the distribution of the pilot signals changes from "sparse" to "dense" as can be seen from the comparison between the distribution of the pilot signals included in the upper subframe (e.g., the head subframe) and the distribution of the pilot signals included in the lower subframe (e.g., the second subframe).

Also in FIG. 10, in terms of the distribution of the pilot signals arranged in the frequency direction, (the transmission symbol of) the pilot signal is arranged every 16 transmission symbols in the frequency direction in the upper subframe, whereas arranged every six transmission symbols in the frequency direction in the lower subframe. In a case where the upper and the lower subframes are commonly considered, the interval between the arrangements thereof is a non-integral multiple.

Herein, in terms of a transmission symbol D6 of the lower subframe, as indicated by the arrows in the drawing, the transmission symbol D6 is a time interpolation signal obtained by performing the interpolation in the time direction by using a past pilot signal and a future pilot signal. In this example, a transmission symbol D7 is used besides the past pilot signal. This transmission symbol D7 is a frequency interpolation signal obtained by performing the interpolation in the frequency direction for the immediately preceding subframe (upper subframe).

That is, in the setting B-2, when the interpolation in the time direction is performed, the pilot signal of the immediately preceding subframe (subframe with the sparse distribution of the pilot signals) at the boundary of the current subframe (subframe with the dense distribution of the pilot signals) is used. However, the distribution of the pilot signals included in the immediately preceding subframe is sparse. Thus, a plurality of points of past pilot signals cannot be used in some cases. Therefore, the equalization performance cannot be enhanced.

Moreover, even if the points are increased by feeding back the equalization information after the frequency interpolation of the immediately preceding subframe (subframe with the sparse distribution of the pilot signals) to use the frequency interpolation signals in the time interpolation for the current subframe (subframe with the dense distribution of the pilot signals) besides the past pilot signals, the equalization information is obtained from the immediately preceding subframe with more sparse distribution of the pilot signals than the current subframe in conclusion. Thus, the reliability thereof cannot be guaranteed. Therefore, the equalization performance cannot be enhanced.

As described above, in the case of the setting A (A-1 and A-2), the distributions of the pilot signals included in the subframes of the subframe temporally earlier and the subframe temporally later change from "dense" to "sparse." Thus, when the interpolation in the time direction is performed regardless of the interval between the arrangements of the pilot signals being an "integral multiple" or "non-integral multiple," the plurality of pilot signals of the immediately preceding subframe (e.g., subframe with the dense distribution of the pilot signals) at the boundary of the current subframe (e.g., subframe with the sparse distribution of the pilot signals) can be used. Therefore, when the interpolation in the time direction is performed, the accuracy of the interpolation is improved. As a result, the equalization performance can be enhanced.

On the other hand, in the case of the setting B (B-1 and B-2), the distributions of the pilot signals included in the subframes of the subframe temporally earlier and the subframe temporally later change from "sparse" to "dense" so that the plurality of points of past pilot signals cannot be used in some cases. Thus, the accuracy of the time interpolation for the current subframe cannot be improved, and the equalization performance cannot also be enhanced. Furthermore, even if the equalization information after the frequency interpolation of the immediately preceding subframe (e.g., subframe with the sparse distribution of the pilot signals) is fed back, the reliability of the equalization information after the frequency interpolation is low. Thus, the equalization performance cannot be enhanced.

That is, since the control parameters such as FFT size and pilot pattern can be arbitrarily set at present, the equalization performance may be deteriorated in some cases in the equalization processing by (the OFDM receiving unit 313) of the existing receiving apparatus 30A depending on the settings, and the countermeasures against the multipath propagation were insufficient. Thereupon, the first embodiment proposes a method for setting control parameters which can enhance the multipath propagation resistance.

Note that the example of the case where two subframes are included in the physical layer frame has been described above with FIGS. 6 and 7 to 10 to simplify the explanation, but this similarly applies to a case where three or more subframes are included in the physical layer frame.

(2) Method for Setting Control Parameters (Method for Setting Control Parameters)

Figure 11:
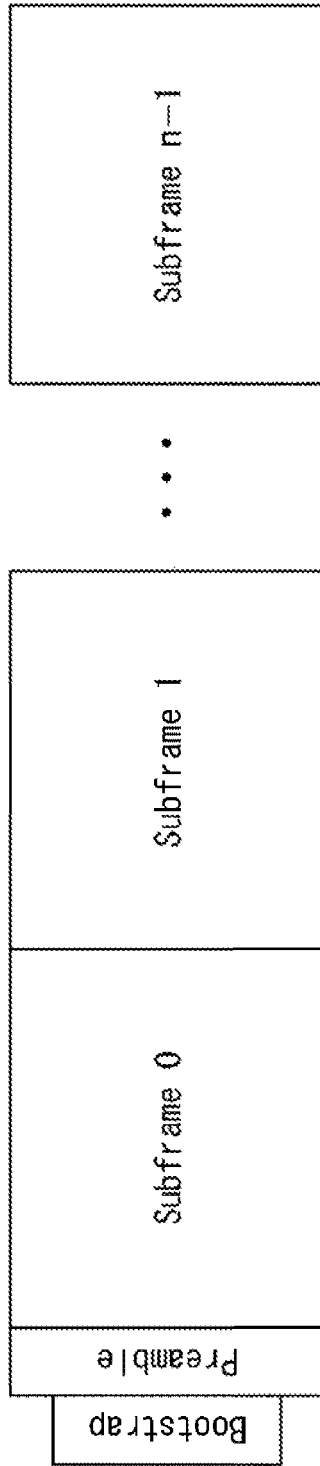
FIG. 11 is a diagram for explaining a method for setting control parameters of each subframe.

FIG. 11 is a diagram for explaining a method for setting control parameters of each subframe.

FIG. 11 shows a case where i number (i=0, 1, to n−1) of subframes are included in the physical layer frame. In the present technology, in a case where the effective symbol length of each subframe is $Tu_i$ and the interval between the pilot signals in the frequency direction is $Dx_i$ in the physical layer frame, the control parameters are set so as to meet the relationship in the following Expression (1).

[Expression 1]

$$Tu_0/Dx_0 \geq Tu_1/Dx_1 \geq \ldots \geq Tu_{n-1}/Dx_{n-1} \qquad (1)$$

That is, in each physical layer frame, by meeting the relationship in Expression (1), the distributions of the pilot signals included in the subframes of the subframe (e.g., Subframe 0) temporally earlier and the subframe temporally later (e.g., Subframe 1) change from "dense" to "sparse." Therefore, as described above, when the interpolation in the time direction is performed, the accuracy of the interpolation is improved. As a result, the equalization performance can be enhanced.

However, in a case where the preamble is included besides the subframes, when the effective symbol length is $Tu_p$ and the interval between the pilot signals in the frequency direction is $Dx_p$ in the preamble, the control parameters are set so as to meet the relationship in the following Expression (2).

[Expression 2]

$$Tu_p/Dx_p \geq Tu_0/Dx_0 \qquad (2)$$

That is, in each physical layer frame, the distribution of the pilot signals changes from "dense" to "sparse" at the boundary between the preamble and the head subframe. Therefore, as described above, when the interpolation in the time direction is performed for the head subframe, the accuracy of the interpolation is improved. As a result, the equalization performance can be enhanced. Note that a bootstrap (Bootstrap) including signals all known is arranged at the head of the physical layer frame.

(Relationship Between Effective Symbol Length (Tu) and FFT Size)

Figure 12:
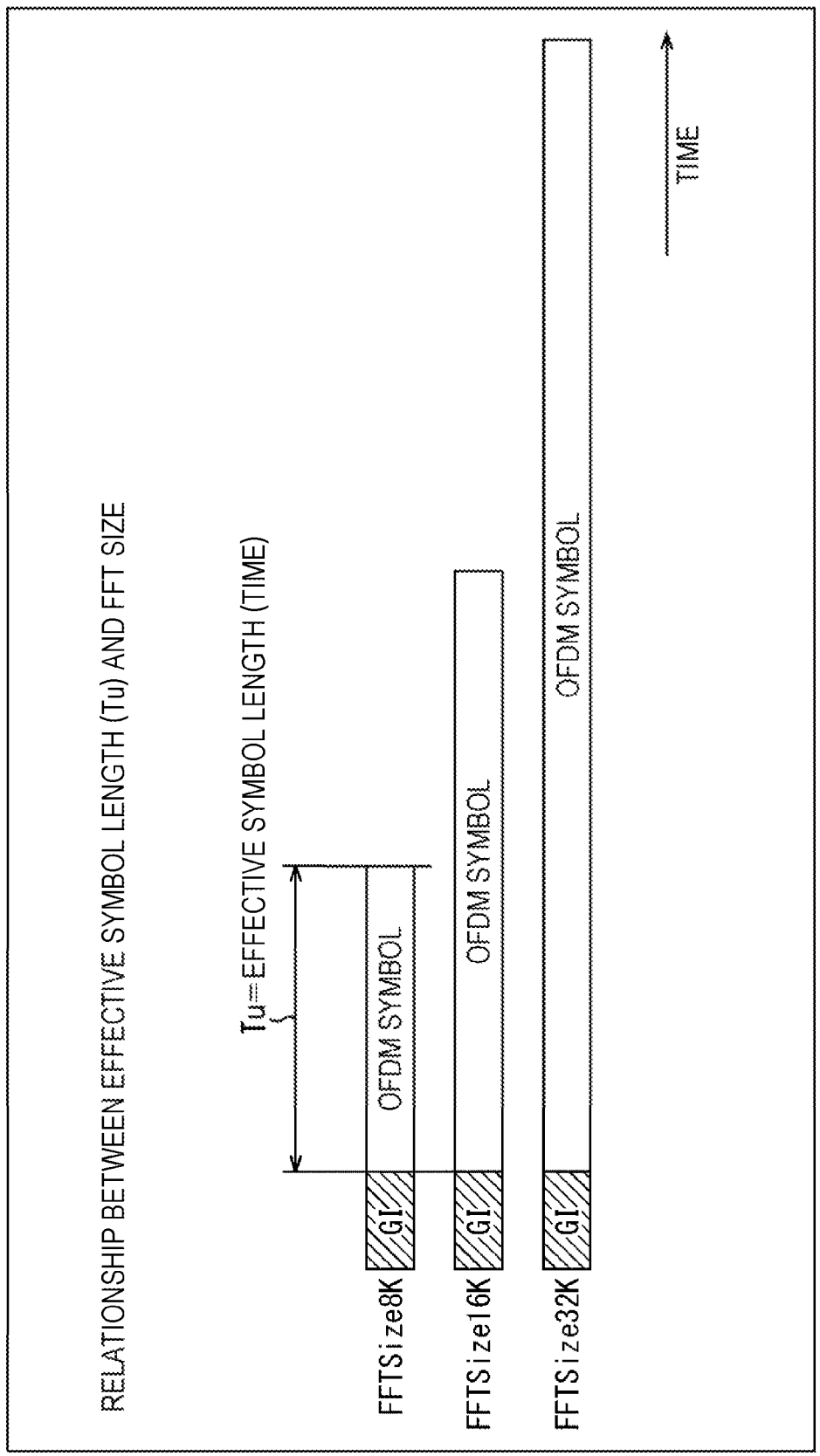
FIG. 12 is a diagram for explaining the relationship between the effective symbol length (Tu) and the FFT size.

FIG. 12 is a diagram for explaining the relationship between the effective symbol length (Tu) and the FFT size.

As shown in FIG. 12, the effective symbol length (Tu) which is a length not including the guard interval (GI) is a value corresponding to the FFT size. Herein, the FFT size is the number of samples (transmission symbols (subcarriers)) to be subjected to one FFT operation (IFTT operation). For example, in ATSC 3.0, three types of FFT sizes, 8K, 16K and 32K, are defined.

For example, the effective symbol length (Tu: 32768) of the FFT size of 32K is equal to four times the effective symbol length (Tu: 8192) of the FFT size of 8K and further equal to twice the effective symbol length (Tu: 16384) of the FFT size of 16K. Therefore, in terms of the effective symbol length ($Tu_i$) of the aforementioned Expression (1), by setting the control parameters so as to meet the relationship in the following Expression (3) for the effective symbol length ($Tu_i$) corresponding to the FFT size so that the subframes are disposed in descending order of the FFT size, the resistance against multipath propagation can be enhanced.

[Expression 3]

$$Tu_0 \geq Tu_1 \geq \ldots \geq Tu_{n-1} \qquad (3)$$

Note that, in a case where the subframes are arranged in the physical layer frame collectively by subframe groups which are the collections of the subframes with the same FFT size, these subframe groups can be led to be disposed in descending order of the FFT size from the above Expression (3).

However, in a case where a preamble is included besides the subframes, the control parameters are set so as to meet the following Expression (4).

[Expression 4]

$$Tu_p \geq Tu_0 \quad (4)$$

That is, in this case, the FFT size of the preamble is the same size or a larger size than the largest FFT size among the FFT sizes of the subframes included in the physical layer frame.

Note that, in terms of the interval ($Dx_i$) between the pilot signals in the frequency direction in the aforementioned Expression (1), the control parameters can also be set so as to meet the following Expression (5).

[Expression 5]

$$DX_0 \leq DX_1 \leq \ldots \leq Dx_{n-1} \quad (5)$$

By thus setting the control parameters of each subframe included in the physical layer frame so as to meet any one or a plurality of relationships in Expressions (1) to (5) previously mentioned, the control parameters of each subframe for suppressing the influence of the multipath propagation are appropriately set. Thus, the multipath propagation resistance can be enhanced.

Note that the control parameters thus set are transmitted by being included in, for example, the L1 signaling (L1 basic information (L1-Basic) and the L1 detailed information (L1-Detail)) arranged in the preamble. Then, these control parameters can be said to be the modulation parameters used for the modulation processing for the sending apparatus on the sending side, whereas can be said to be the demodulation parameters used for the demodulation processing for the receiving apparatus on the receiving side.

(3) System Configuration (Configuration Example of Transmission System)

Figure 13:
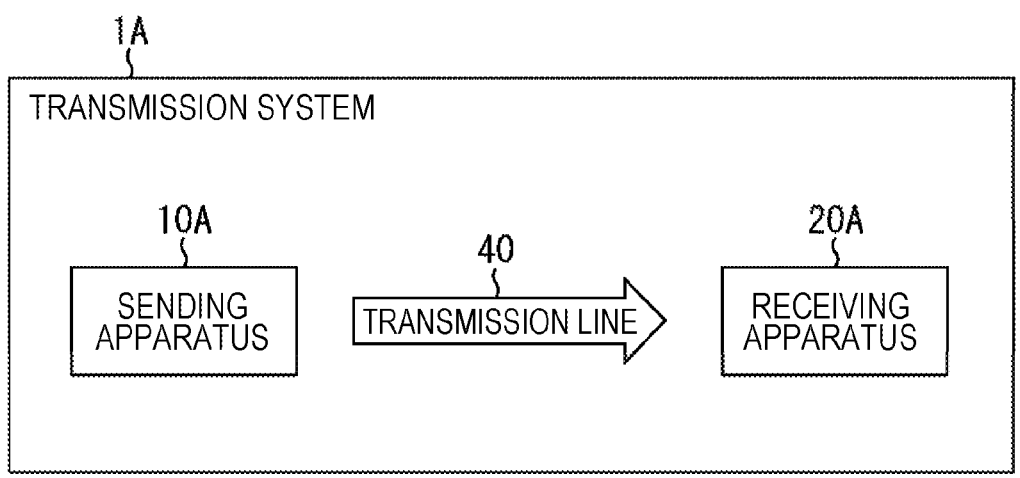
FIG. 13 is a diagram showing the configuration of one embodiment of a transmission system to which the present technology is applied.

FIG. 13 is a diagram showing the configuration of one embodiment of a transmission system to which the present technology is applied. Note that "system" means a plurality of apparatuses logically gathered.

In FIG. 13, a transmission system 1A includes a sending apparatus 10A and a receiving apparatus 20A. In this transmission system 1A, data transmission compliant to a digital broadcast standard such as ATSC 3.0 or the like is performed.

The sending apparatus 10A sends the contents via a transmission line 40. For example, the sending apparatus 10A sends a broadcast stream, which includes (the components of) a video, audio and the like constituting the contents such as a broadcast program and the like and signaling, as digital broadcast signals via the transmission line 40.

The receiving apparatus 20A receives and outputs the contents sent from the sending apparatus 10A via the transmission line 40. For example, the receiving apparatus 20A receives the digital broadcast signals from the sending apparatus 10A, acquires (the components of) the video, the audio and the like constituting the contents and the signaling from the broadcast stream, and reproduces the picture and the audio of the contents such as the broadcast program and the like.

Note that only one receiving apparatus 20A is shown in the transmission system 1A in FIG. 13 to simplify the explanation, but a plurality of receiving apparatuses 20A can be provided, and the plurality of receiving apparatuses 20A can simultaneously receive the digital broadcast signals sent (simultaneous broadcast distribution) by the sending apparatus 10A via the transmission line 40.

Moreover, a plurality of sending apparatuses 10A can also be provided in the transmission system 1A in FIG. 13. Each of the plurality of sending apparatuses 10A sends digital broadcast signals including the broadcast stream, for example, in a separate frequency band as a separate channel, and a channel for receiving the broadcast stream can be selected in the receiving apparatus 20A from among the respective channels of the plurality of sending apparatuses 10A.

Furthermore, in the transmission system 1A in FIG. 13, the transmission line 40 may be, for example, satellite broadcasting using a broadcasting satellite (BS) or a communications satellite (CS), cable broadcasting (CATV) using a cable, or the like, besides the ground wave (terrestrial broadcasting).

Note that, in ATSC 3.0 which is one of the next generation terrestrial broadcast standards, a system using IP/UDP packets, that is, Internet protocol (IP) packets including user datagram protocol (UDP) packets, instead of transport stream (TS) packets, is presumed to be mainly adopted for the data transmission. In addition, even in broadcast systems besides ATSC 3.0, a system using the IP packets is expected to be adopted in the future.

(Configuration Example of Sending Apparatus)

Figure 14:
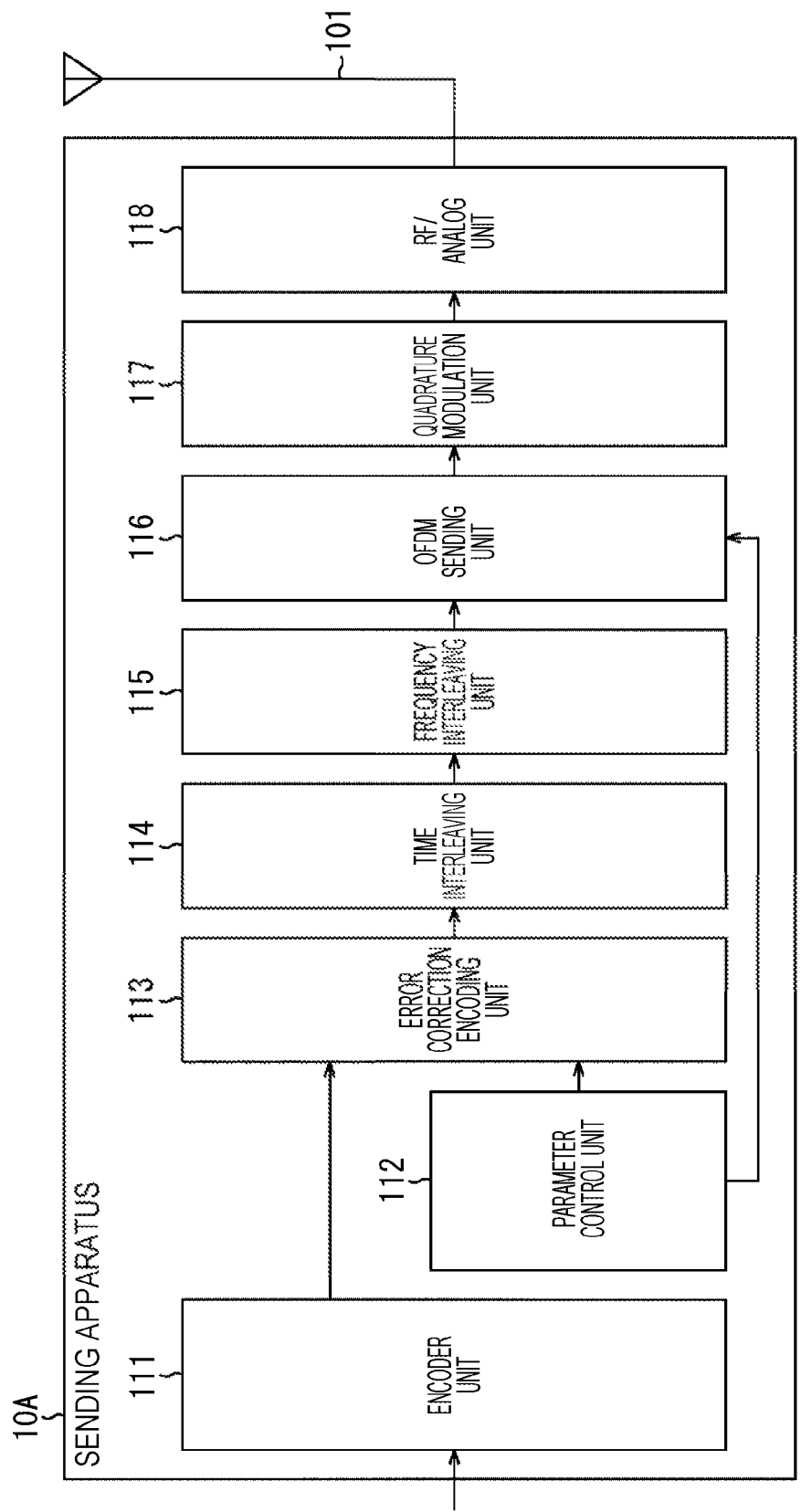
FIG. 14 is a diagram showing a configuration example of the sending apparatus according to the present technology.

FIG. 14 is a diagram showing a configuration example of the sending apparatus 10A in FIG. 13.

In FIG. 14, the sending apparatus 10A includes an encoder unit 111, a parameter control unit 112, an error correction encoding unit 113, a time interleaving unit 114, a frequency interleaving unit 115, an OFDM sending unit 116, a quadrature modulation unit 117 and an RF/analog unit 118.

The encoder unit 111 encodes data (of each subframe) inputted from a preceding circuit (not shown) and supplies the encoded data to the error correction encoding unit 113.

The parameter control unit 112 generates data of the L1 signaling (preamble) including various control parameters and supplies the data to the error correction encoding unit 113. For example, the L1 basic information (L1-Basic), the L1 detailed information (L1-Detail) and the like are generated as the L1 signaling.

The parameter control unit 112 also supplies the control parameters of each subframe included in the physical layer frame to the OFDM sending unit 116. For example, information such as FFT size and pilot pattern of each subframe is included as these control parameters and supplied to the OFDM sending unit 116.

The error correction encoding unit 113 performs error encoding processing (e.g., BCH encoding, low density parity check (LDPC) encoding or the like) on the data supplied from the encoder unit 111 and the parameter control unit 112. The error correction encoding unit 113 supplies the data after the error correction encoding to the time interleaving unit 114.

The time interleaving unit 114 interleaves the data supplied from the error correction encoding unit 113 in the time direction and supplies the data interleaved in the time direction to the frequency interleaving unit 115.

The frequency interleaving unit 115 interleaves the data supplied from the time interleaving unit 114 in the frequency direction and supplies the data interleaved in the frequency direction to the OFDM sending unit 116.

The OFDM sending unit 116 performs the IFFT operation on the data supplied from the frequency interleaving unit 115 and supplies the OFDM signal thereby obtained to the quadrature modulation unit 117. Note that the signaling of the bootstrap is included in the OFDM signal.

Moreover, the control parameters of each subframe are supplied to the OFDM sending unit 116 from the parameter control unit 112. The OFDM sending unit 116 performs modulation processing on each subframe included in the physical layer frame according to the control parameters of each subframe.

Herein, the control parameters include the FFT size and the pilot pattern for each subframe, and the OFDM sending unit 116 processes the subframes and the preamble arranged in the physical layer frame so as to meet any one or a plurality of the relationships in Expressions (1) to (5) previously mentioned.

The quadrature modulation unit 117 orthogonally modulates the baseband OFDM signal supplied from the OFDM sending unit 116 and supplies the signal thereby obtained to the RF/analog unit 118. Note that the signal processed by the quadrature modulation unit 117 is subjected to digital/analog (D/A) conversion processing, converted into an analog signal from a digital signal, and then inputted into the RF/analog unit 118.

The RF/analog unit 118 is connected to an antenna 101 and sends the signal supplied from the quadrature modulation unit 117 as a radio frequency (RF) signal to the receiving apparatus 20A via the transmission line 40.

(Flow of Modulation Processing on Sending Side of Present Technology)

Next, the flow of the modulation processing on the sending side of the present technology, which is executed by the sending apparatus 10A in FIG. 13, will be described with reference to the flowchart in FIG. 15. Note that, in the description with FIG. 15, the processings executed by the parameter control unit 112 and the OFDM sending unit 116 will be mainly described.

In Step S101, the parameter control unit 112 generates the data of the L1 signaling (preamble) including various control parameters. For example, the L1 basic information (L1-Basic), the L1 detailed information (L1-Detail) and the like are generated as the L1 signaling.

Moreover, the parameter control unit 112 supplies the control parameters including, for example, the information such as the FFT size and pilot pattern for each subframe to the OFDM sending unit 116.

Note that, although detailed explanation will be omitted herein, the time interleaving unit 114 and the frequency interleaving unit 115 perform the interleavings in the time direction and the frequency direction on the data of the L1 signaling generated by the processing in Step S101 after the error correction encoding unit 113 performs the error correction encoding processing.

In Step S102, the OFDM sending unit 116 modulates each subframe (subframe symbol) on the basis of the control parameters for each subframe generated by the processing in Step S101.

In Step S103, it is determined whether the modulation of the last subframe has been completed by performing the modulation of the subframe by the processing in Step S102. In a case where it is determined in Step S103 that the modulation of the last subframe has not been completed, the processing returns to Step S102, and the modulation processing on each subframe is performed according to the control parameters of each subframe by the processing in Step S102.

Herein, the control parameters include the FFT size and the pilot pattern for each subframe, and, for example, the OFDM sending unit 116 modulates the subframes arranged in the physical layer frame so as to meet the relationship in Expression (1) or (3) previously mentioned.

Then, in a case where it is determined in Step S103 that the modulation of the last subframe included in the current physical layer frame has been completed, the processing proceeds to Step S104.

Note that, although detailed explanation will be omitted herein, the time interleaving unit 114 and the frequency interleaving unit 115 perform the interleavings in the time direction and the frequency direction on the data encoded by the encoder unit 111 after the error correction encoding unit 113 performs the error correction encoding processing, and the data thereby obtained is modulated by the OFDM sending unit 116 for each subframe.

In Step S104, on the basis of the control parameters of the preamble generated by the processing in Step S101, the OFDM sending unit 116 modulates the preamble symbol of the L1 signaling generated by the processing in Step S101.

Herein, the control parameters of the preamble include the FFT size and the pilot pattern of the preamble, and, for example, the OFDM sending unit 116 modulates the preamble arranged in the physical layer frame so as to meet the relationship in Expression (2) or (4) previously mentioned.

In Step S105, the OFDM sending unit 116 generates the signaling of the bootstrap including the control parameters.

In Step S106, the OFDM sending unit 116 modulates the signaling of the bootstrap generated by the processing in Step S105.

When the processing in Step S106 ends, the processing returns to Step S101. Then, the processings in Steps S101 to S106 described above are repeated with the next current physical layer frame.

The flow of the modulation processing on the sending side of the present technology has been described above.

(Configuration Example of Receiving Apparatus)

Figure 16:
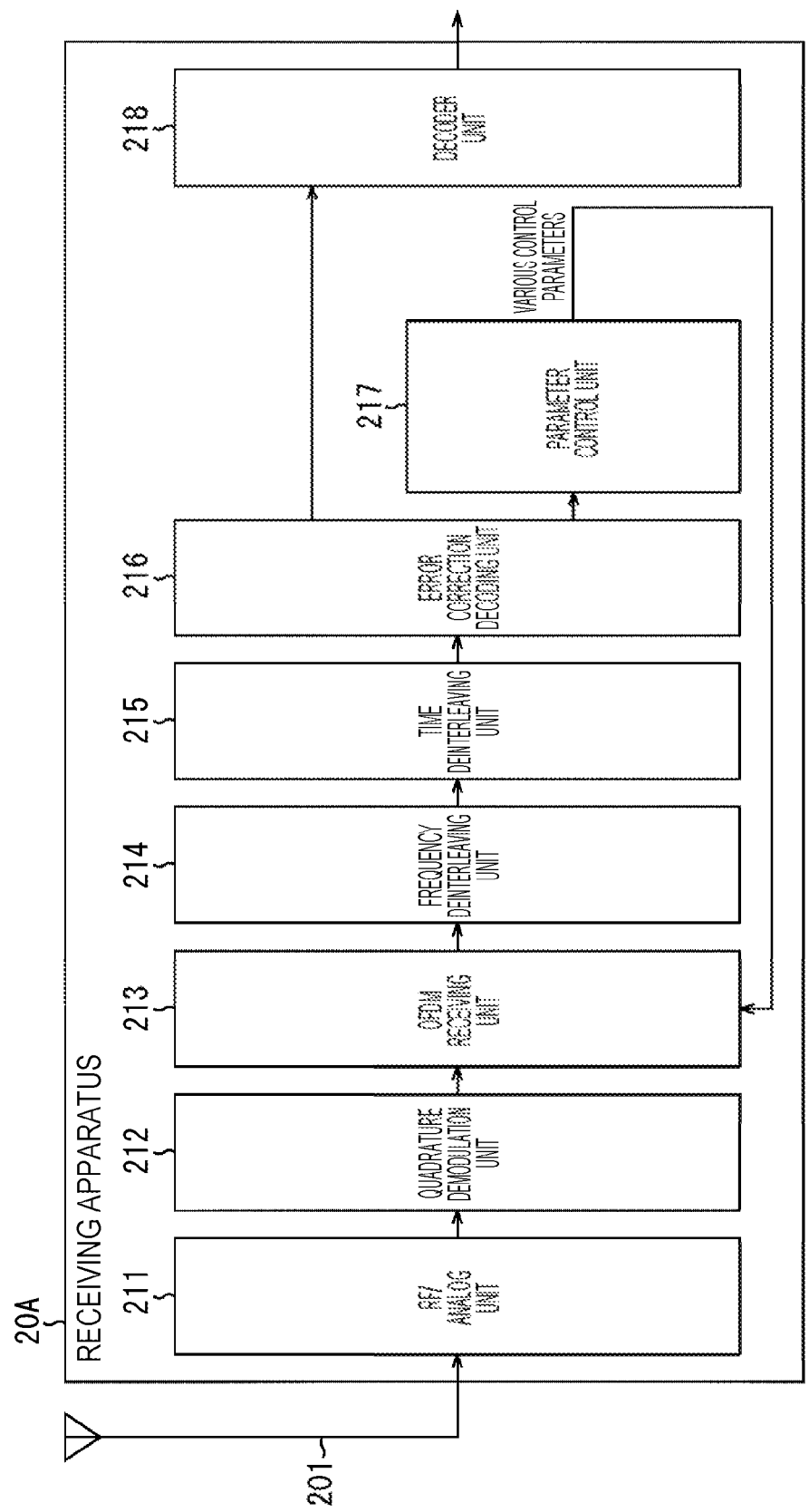
FIG. 16 is a diagram showing a configuration example of the receiving apparatus according to the present technology.

FIG. 16 is a diagram showing a configuration example of the receiving apparatus 20A in FIG. 13.

In FIG. 16, the receiving apparatus 20A includes an RF/analog unit 211, a quadrature demodulation unit 212, an OFDM receiving unit 213, a frequency deinterleaving unit 214, a time deinterleaving unit 215, an error correction decoding unit 216, a parameter control unit 217 and a decoder unit 218.

The RF/analog unit 211 is connected to an antenna 201 and receives the RF signal sent from the sending apparatus 10A via the transmission line 40. The RF/analog unit 211 processes the RF signal and supplies the signal to the quadrature demodulation unit 212. Note that the signal processed by the RF/analog unit 211 is subjected to A/D conversion processing, converted into a digital signal from an analog signal, and then inputted into the quadrature demodulation unit 212.

The quadrature demodulation unit 212 orthogonally demodulates the signal supplied from the RF/analog unit 211 and supplies the baseband OFDM signal obtained as a result to the OFDM receiving unit 213.

The OFDM receiving unit 213 performs the FFT operation on the OFDM signal supplied from the quadrature demodulation unit 212, extracts data orthogonally demodulated to each subcarrier, and supplies the extracted data to the frequency deinterleaving unit 214.

Moreover, the control parameters including, for example, the information such as the FFT size and pilot pattern for each subframe are supplied to the OFDM receiving unit 213 from the parameter control unit 217. The OFDM receiving unit 213 performs demodulation processing on each subframe included in the physical layer frame according to the control parameters of each subframe. The OFDM receiving unit 213 also performs demodulation processing on the preamble included in the physical layer frame according to the control parameters of the preamble.

Note that the detailed configuration of the OFDM receiving unit 213 will be described later with reference to FIGS. 18 and 19.

The frequency deinterleaving unit 214 deinterleaves the data supplied from the OFDM receiving unit 213 in the frequency direction and supplies the data deinterleaved in the frequency direction to the time deinterleaving unit 215.

The time deinterleaving unit 215 deinterleaves the data supplied from the frequency deinterleaving unit 214 in the time direction and supplies the data deinterleaved in the time direction to the error correction decoding unit 216.

The error correction decoding unit 216 performs error correction processing (e.g., LDPC decoding, BCH decoding or the like) on the data supplied from the time deinterleaving unit 215. Among the data after the error correction, the error correction decoding unit 216 supplies the data of the preamble to the parameter control unit 217 as well as supplies the data of the subframe to the decoder unit 218.

The parameter control unit 217 processes the data supplied from the error correction decoding unit 216 and supplies various control parameters included in the L1 signaling to each unit (e.g., the OFDM receiving unit 213) of the receiving apparatus 20.

The decoder unit 218 decodes the data (of each subframe) supplied from the error correction decoding unit 216 and outputs the encoded data to a subsequent circuit (not shown).

(Flow of Demodulation Processing on Receiving Side of Present Technology)

Next, the flow of the demodulation processing on the receiving side of the present technology, which is executed by the receiving apparatus 20A in FIG. 13, will be described with reference to the flowchart in FIG. 17. However, in the description with FIG. 17, the processings executed by the OFDM receiving unit 213 and the parameter control unit 217 will be mainly described.

In Step S201, the OFDM receiving unit 213 detects the wave of the bootstrap (the portion of the head preamble) of the physical layer frame. Herein, in a case of detecting the wave of the bootstrap, the OFDM receiving unit 213 performs correlated calculation of the time domain for the baseband OFDM signal and detects (detects the wave) where the autocorrelation becomes the maximum as a trigger position of the bootstrap.

In Step S202, the OFDM receiving unit 213 performs equalization processing on the bootstrap whose wave is detected by the processing in Step S201 and demodulates the bootstrap.

In Step S203, the OFDM receiving unit 213 decodes the signaling of the bootstrap demodulated by the processing in Step S202 and performs parameter control using the control parameters thereby obtained.

In Step S204, the OFDM receiving unit 213 performs equalization processing on the preamble symbol according to the parameter control by the processing in Step S203 and demodulates the preamble symbol.

Note that, although detailed explanation will be omitted herein, the frequency deinterleaving unit 214 and the time deinterleaving unit 215 perform the deinterleavings in the frequency direction and the time direction on the preamble symbol demodulated by the processing in Step S204, and thereafter the error correction decoding unit 216 performs the error correction decoding processing.

In Step S205, the parameter control unit 217 decodes the L1 signaling included in the preamble obtained by the processing in Step S204 or the like and performs parameter control using various control parameters thereby obtained.

In Step S206, the OFDM receiving unit 213 performs equalization processing on each subframe (subframe symbol) according to the parameter control by the processing in Step S205 and demodulates the subframe.

In Step S207, it is determined whether the demodulation of the last subframe has been completed by performing the demodulation of the subframe by the processing in Step S206. In a case where it is determined in Step S207 that the demodulation of the last subframe has not been completed, the processing returns to Step S206, and the demodulation processing on each subframe is performed according to the control parameters of each subframe by the processing in Step S206.

Herein, the preamble and the subframe arranged in the physical layer frame are modulated so as to meet any one or a plurality of the relationships in Expressions (1) to (5) previously mentioned, and the demodulation processings on such preamble and subframe are performed by the processings in Steps S204 and S206.

Note that, although detailed explanation will be omitted herein, the frequency deinterleaving unit 214 and the time deinterleaving unit 215 and perform the deinterleavings in the frequency direction and the time direction on the subframe demodulated by the processing in Step S206, and thereafter the error correction decoding unit 216 performs the error correction decoding processing. Then, in the decoder unit 218, the data (of the subframe) obtained by the processing in Step S206 or the like is decoded and outputted.

Then, in a case where it is determined in Step S207 that the demodulation of the last subframe included in the current physical layer frame has been completed, the processing returns to Step S202. Then, the processings in Steps S202 to S207 described above are repeated with the next current physical layer frame.

The flow of the demodulation processing on the receiving side of the present technology has been described above.

(Configuration of OFDM Receiving Unit of Present Technology)

Herein, there are settings A-1 and A-2 as cases where the distribution (pilot pattern) of the pilot signals changes from "dense" to "sparse" as previously mentioned, and the configuration of the OFDM receiving unit 213 (FIG. 16) is different between a case where the setting A-1 is set and a case where the setting A-2 is set. Thereupon, an OFDM receiving unit 213A-1 compatible with the setting A-1 and an OFDM receiving unit 213A-2 compatible with the setting A-2 will be described hereinafter with reference to FIGS. 18 and 19, respectively.

(Configuration Example of OFDM Receiving Unit Compatible with Setting A-1)

Figure 18:
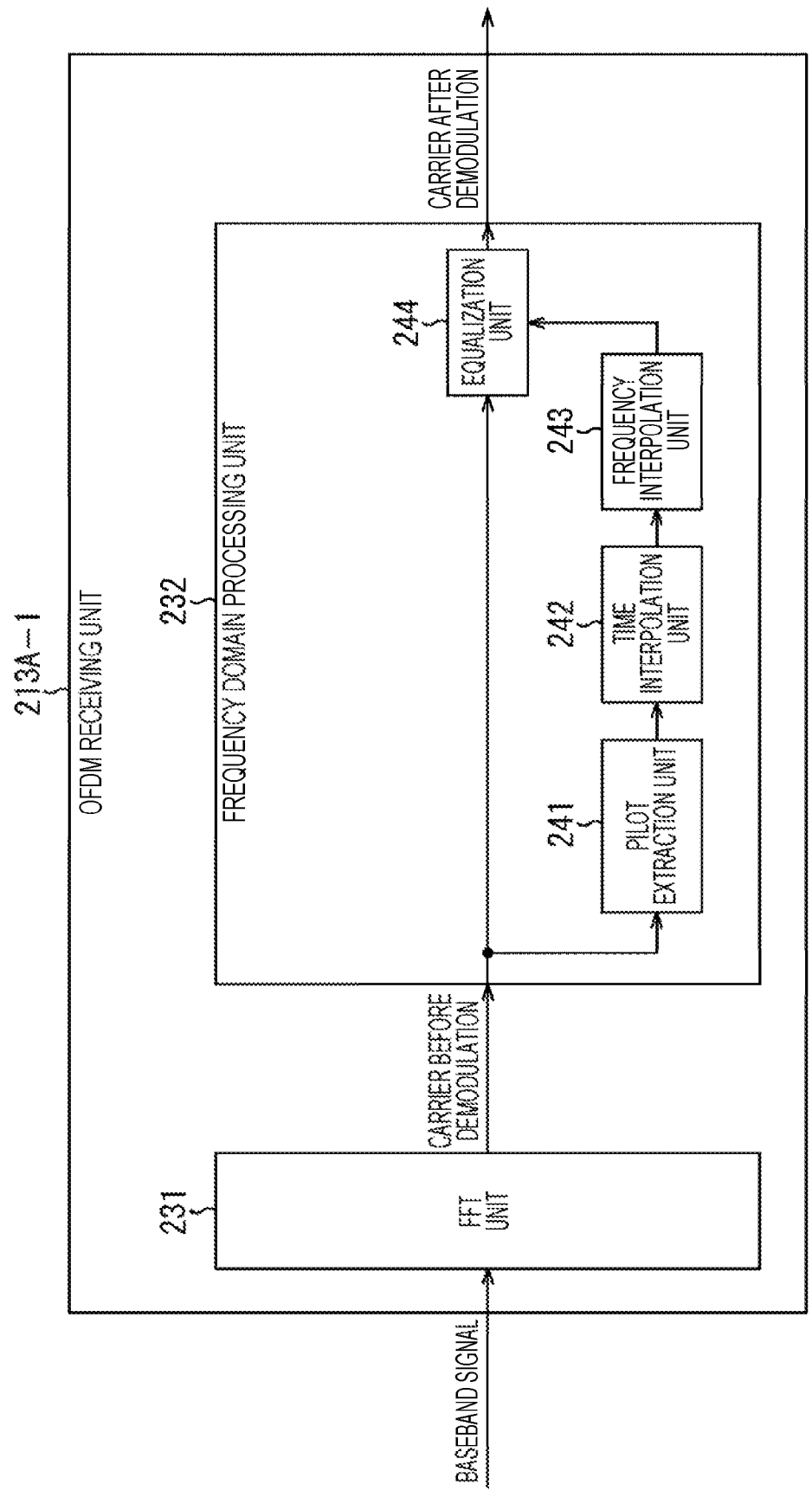
FIG. 18 is a diagram showing a configuration example (compatible with the setting A-1) of an OFDM receiving unit according to the present technology.

FIG. 18 is a diagram showing a configuration example of the OFDM receiving unit 213A-1 compatible with the setting A-1.

The OFDM receiving unit 213A-1 includes an FFT unit 231 and a frequency domain processing unit 232.

The baseband signal (OFDM signal) is inputted into the FFT unit 231 from the quadrature demodulation unit 212 (FIG. 16). Note that this baseband OFDM signal is an OFDM time domain signal which is a signal in the time domain before the FFT operation is performed.

On the basis of the FFT trigger, the FFT unit 231 performs the FFT operation on the OFDM time domain signal as a baseband signal, extracts data orthogonally modulated to each subcarrier, and supplies the extracted data to the frequency domain processing unit 232.

Note that this signal outputted from the FFT unit 231 is an OFDM frequency domain signal which is a signal in the frequency domain after the FFT operation is performed. Moreover, the FFT trigger is obtained by performing correlated calculation on the bootstrap for the OFDM time domain signal or generated according to the control parameters from the parameter control unit 217.

The frequency domain processing unit 232 performs predetermined frequency domain processing (e.g., equalization processing or the like) on the OFDM frequency domain signal supplied from the FFT unit 231 and supplies data thereby obtained to the subsequent frequency deinterleaving unit 214 (FIG. 16).

The frequency domain processing unit 232 includes a pilot extraction unit 241, a time interpolation unit 242, a frequency interpolation unit 243 and an equalization unit 244. Moreover, the OFDM frequency domain signal supplied from the FFT unit 231 is inputted into the pilot extraction unit 241 and the equalization unit 244.

The pilot extraction unit 241 extracts, for example, a pilot signal arranged as shown in FIG. 7 from the OFDM frequency domain signal from the FFT unit 231 and supplies the pilot signal to the time interpolation unit 242.

The time interpolation unit 242 performs interpolation in the time direction using the pilot signal supplied from the pilot extraction unit 241 in the time direction (symbol direction) and supplies time direction interpolation data, which is the data after the interpolation, to the frequency interpolation unit 243.

Herein, for example, the pilot signal arranged as shown in FIG. 7 is interpolated in the time direction. The distribution of the pilot signals changes from "dense" to "sparse" as can be seen from the comparison between the distribution of the pilot signals included in the subframe temporally earlier (e.g., the head subframe) and the distribution of the pilot signals included in the subframe temporally later (e.g., the second subframe).

Therefore, when the interpolation in the time direction is performed, the pilot signals of the immediately preceding subframe (subframe with the dense distribution of the pilot signals) at the boundary of the current subframe (subframe with the sparse distribution of the pilot signals) can be directly used plurally. Thus, the accuracy of the interpolation is improved. As a result, the equalization performance can be enhanced.

The frequency interpolation unit 243 performs filtering for interpolating the time direction interpolation data supplied from the time interpolation unit 242 in the frequency direction and supplies frequency direction interpolation data, which is the data interpolated in the frequency direction, to the equalization unit 244. However, this frequency direction interpolation data can also said to be the estimated value (transmission line characteristic data) obtained by estimating the transmission line characteristics interpolated in the frequency direction by interpolating the time direction interpolation data in the frequency direction, that is, the transmission line characteristics for each transmission symbol (each subcarrier) of the OFDM symbol.

The equalization unit 244 targets the OFDM frequency domain signal supplied from the FFT unit 231 and performs distortion correction for correcting the amplitude and phase distortion received by the subcarrier of the OFDM signal on the transmission line by using the frequency direction interpolation data (transmission line characteristic data) supplied from the frequency interpolation unit 243.

In this distortion correction, the distortion correction to equalize the OFDM signal received from the sending apparatus 10A is performed such that the amplitude and phase of the subcarrier of the OFDM signal received from the sending apparatus 10A become equal to the amplitude and phase of the subcarrier of the OFDM signal sent by the sending apparatus 10A.

That is, in the OFDM, (the transmission symbol of) a known pilot signal whose amplitude and phase are predetermined is discretely inserted as a transmission symbol (subcarrier) constituting the OFDM symbol in the sending apparatus 10A. Then, in the receiving apparatus 20A, the transmission line characteristics which are characteristics (frequency characteristics) of the transmission line are estimated on the basis of the amplitude and phase of the pilot signal, and the distortion correction of the OFDM signal is performed by using the transmission line characteristic data representing those transmission line characteristics.

The equalization unit 244 supplies the OFDM frequency domain signal after the distortion correction to the subsequent frequency deinterleaving unit 214 (FIG. 16).

The configuration of the OFDM receiving unit 213A-1 compatible with the setting A-1 has been described above.

(Configuration Example of OFDM Receiving Unit Compatible with Setting A-2)

Figure 19:
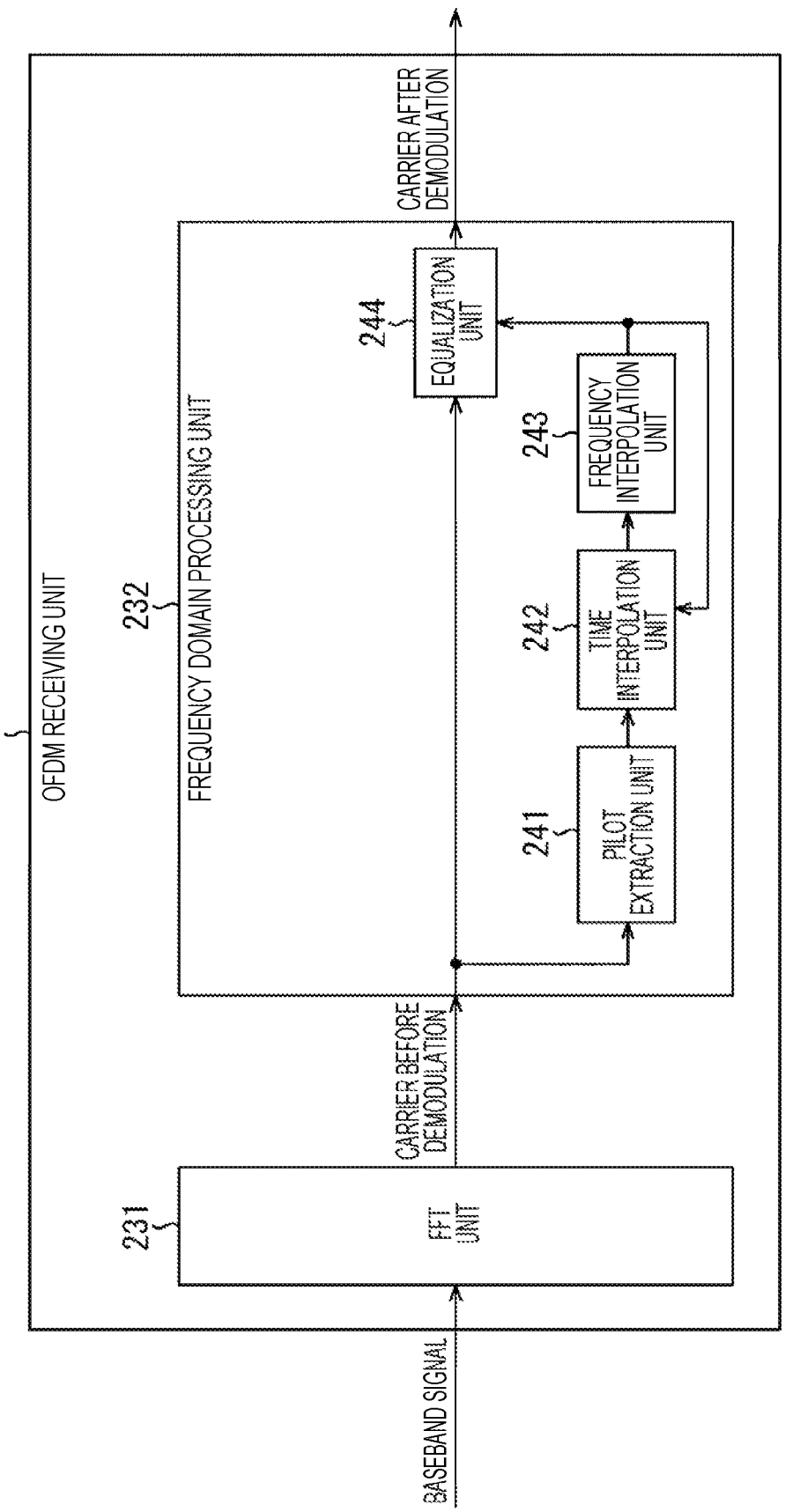
FIG. 19 is a diagram showing a configuration example (compatible with the setting A-2) of the OFDM receiving unit according to the present technology.

FIG. 19 is a diagram showing a configuration example of the OFDM receiving unit 213A-2 compatible with the setting A-2.

In the OFDM receiving unit 213A-2 in FIG. 19, portions corresponding to those in the OFDM receiving unit 213A-1 in FIG. 18 are denoted by the same reference signs, and the descriptions thereof will be omitted as appropriate.

That is, in a frequency domain processing unit 232 of the OFDM receiving unit 213A-2, a frequency interpolation unit 243 supplies the equalization information after the frequency interpolation to an equalization unit 244 as well as feeds back the equalization information to a preceding time interpolation unit 242. The time interpolation unit 242 performs the time interpolation processing on the basis of the pilot signal extracted by the pilot extraction unit 241 and the equalization information after the frequency interpolation fed back by the frequency interpolation unit 243.

Herein, for example, the pilot signal and the frequency interpolation signal arranged as shown in FIG. 8 are interpolated in the time direction. Like the setting A-1 described above, the distribution of the pilot signals changes from "dense" to "sparse" as can be seen from the comparison between the distribution of the pilot signals included in the subframe temporally earlier (e.g., the head subframe) and the distribution of the pilot signals included in the subframe temporally later (e.g., the second subframe).

Therefore, when the interpolation in the time direction is performed, by feeding back the equalization information after the frequency interpolation of the immediately preceding subframe (subframe with the dense distribution of the pilot signals) at the boundary of the current subframe (subframe with the sparse distribution of the pilot signals), the pilot signals of the immediately preceding subframe (subframe with the dense distribution of the pilot signals) as well as highly reliable frequency interpolation signals can be used plurally. Thus, the accuracy of the interpolation is improved. As a result, the equalization performance can be enhanced.

The configuration of the OFDM receiving unit 213A-2 compatible with the setting A-2 has been described above.

By thus arranging the preamble and the subframes (subframe groups) in each physical layer frame so as to meet any one or a plurality of the relationships in Expressions (1) to (5) previously mentioned, it is possible to suppress the influence of the multipath propagation (enhance the multipath propagation resistance) in the first embodiment.

3. Second Embodiment

As described above, the control parameters such as FFT size and the like can be arbitrarily set for each of one or more subframes included in the physical layer frame. For example, in ATSC 3.0, three kinds of FFT sizes, 8K, 16K and 32K can be set for each subframe.

Herein, particularly in mobile receivers such as smart phones, cellular phones, tablet terminal apparatuses and the like, it is known that, when the FFT size is large, the carrier interval becomes narrow so that the influence of Doppler shift is prone to be received and the reception performance is deteriorated. Moreover, in the mobile receivers, there is a possibility that the L1 signaling of the preamble cannot be decoded when the FFT size of the preamble of the physical layer frame is large, and the subframe cannot be demodulated in a case where the L1 signaling cannot be decoded.

On the other hand, in fixed receivers without mobile reception, for example, there is a demand to be compatible with a larger FFT size such as 32K for the purpose of providing a broadcast program with a larger amount of information. Hereinafter, a receiving apparatus (mobile receiver) of the present technology will be described after existing receiving apparatuses (fixed receiver and mobile receiver) are described.

Figure 20:
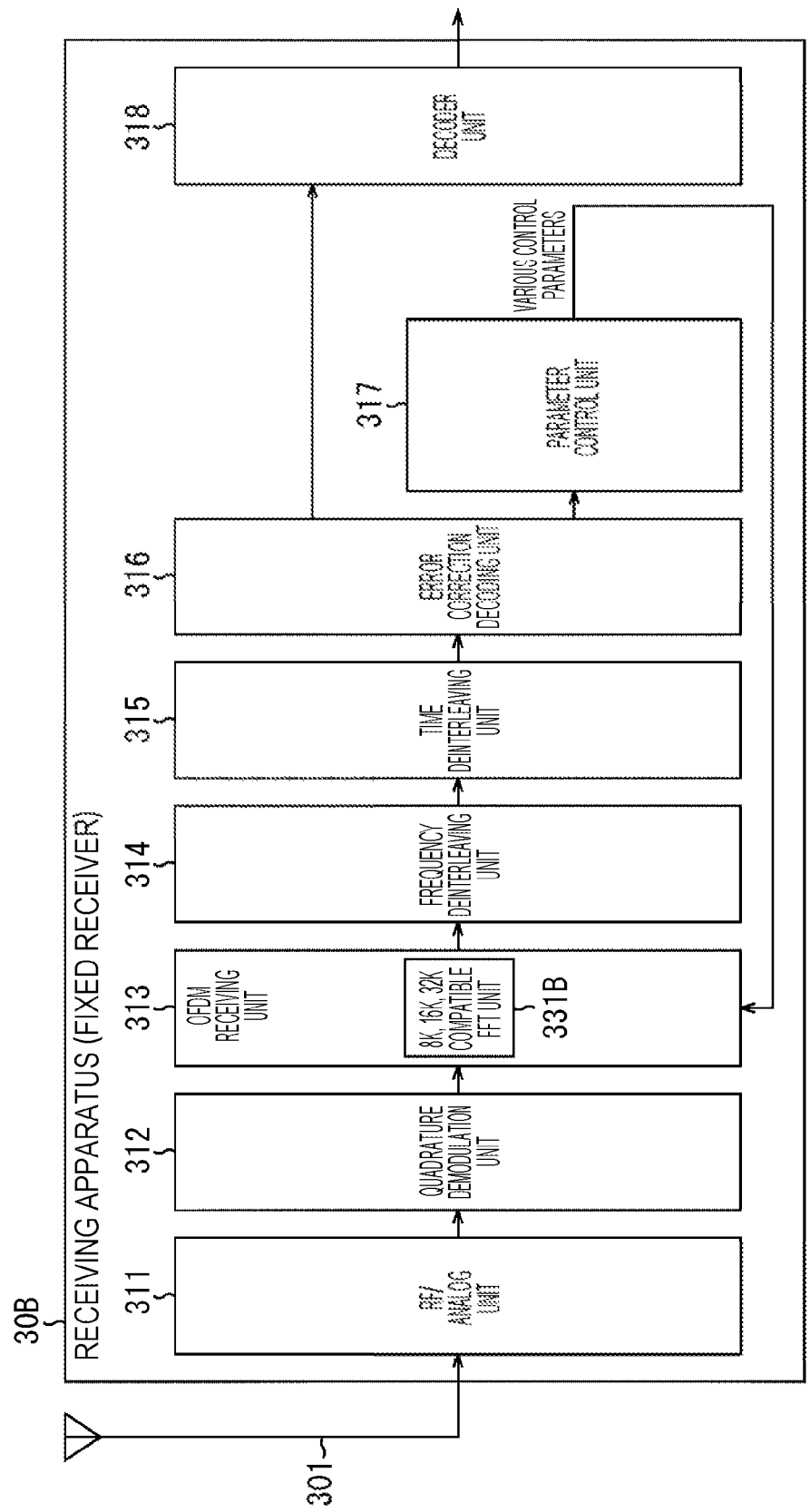
FIG. 20 is a diagram showing the configuration of an existing fixed receiver.

(1) Existing Configurations
(Configuration of Existing Receiving Apparatus)
FIG. 20 is a diagram showing the configuration of an existing receiving apparatus 30B.

In the existing receiving apparatus 30B in FIG. 20, portions corresponding to those in the receiving apparatus 30A in FIG. 2 are denoted by the same reference signs, and the descriptions thereof will be omitted as appropriate.

That is, the existing receiving apparatus 30B is a fixed receiver installed at user's home or the like, and an OFDM receiving unit 313 has an FFT unit 331B compatible with the FFT sizes of 8K, 16K and 32K. Therefore, in the OFDM receiving unit 313, the FFT unit 331B can perform the FFT operation at 32K, which has a larger FFT size, for an OFDM time domain signal as a baseband signal.

(Flow of Demodulation Processing of Existing Fixed Receiver)
Next, the flow of the demodulation processing of the existing fixed receiver, which is executed by the receiving apparatus 30B in FIG. 20, will be described with reference to the flowchart in FIG. 21.

In Step S301, the OFDM receiving unit 313 detects the wave of the bootstrap of the physical layer frame.

In Step S302, the OFDM receiving unit 313 performs equalization processing on the bootstrap whose wave is detected by the processing in Step S301 and demodulates the bootstrap.

In Step S303, the OFDM receiving unit 313 decodes the signaling of the bootstrap demodulated by the processing in Step S302 and performs parameter control using the control parameters thereby obtained.

In Step S304, the OFDM receiving unit 313 performs equalization processing on the preamble symbol according to the parameter control by the processing in Step S303 and demodulates the preamble symbol.

In Step S305, the parameter control unit 317 decodes the L1 signaling included in the preamble obtained by the processing in Step S304 or the like and performs parameter control using various control parameters thereby obtained.

In Step S306, the OFDM receiving unit 313 performs equalization processing on each subframe (subframe symbol) according to the parameter control by the processing in Step S305 and demodulates the subframe. Herein, the OFDM receiving unit 313 performs the FFT operation with an FFT size of 32K for the OFDM time domain signal as the baseband signal and demodulates the subframe. Thus, for example, it is possible to reproduce even a broadcast program with a larger amount of information in the receiving apparatus 30B.

In Step S307, it is determined whether the demodulation of the last subframe has been completed by performing the demodulation of the subframe by the processing in Step S306. In a case where it is determined in Step S307 that the demodulation of the last subframe has not been completed, the processing returns to Step S306, and the processing in Step S306 is repeated.

Then, in a case where it is determined in Step S307 that the demodulation of the last subframe included in the current physical layer frame has been completed, the processing returns to Step S302. Then, the processings in Steps S302 to S307 described above are repeated with the next current physical layer frame.

The flow of the demodulation processing of the existing fixed receiver has been described above.

Figure 22:
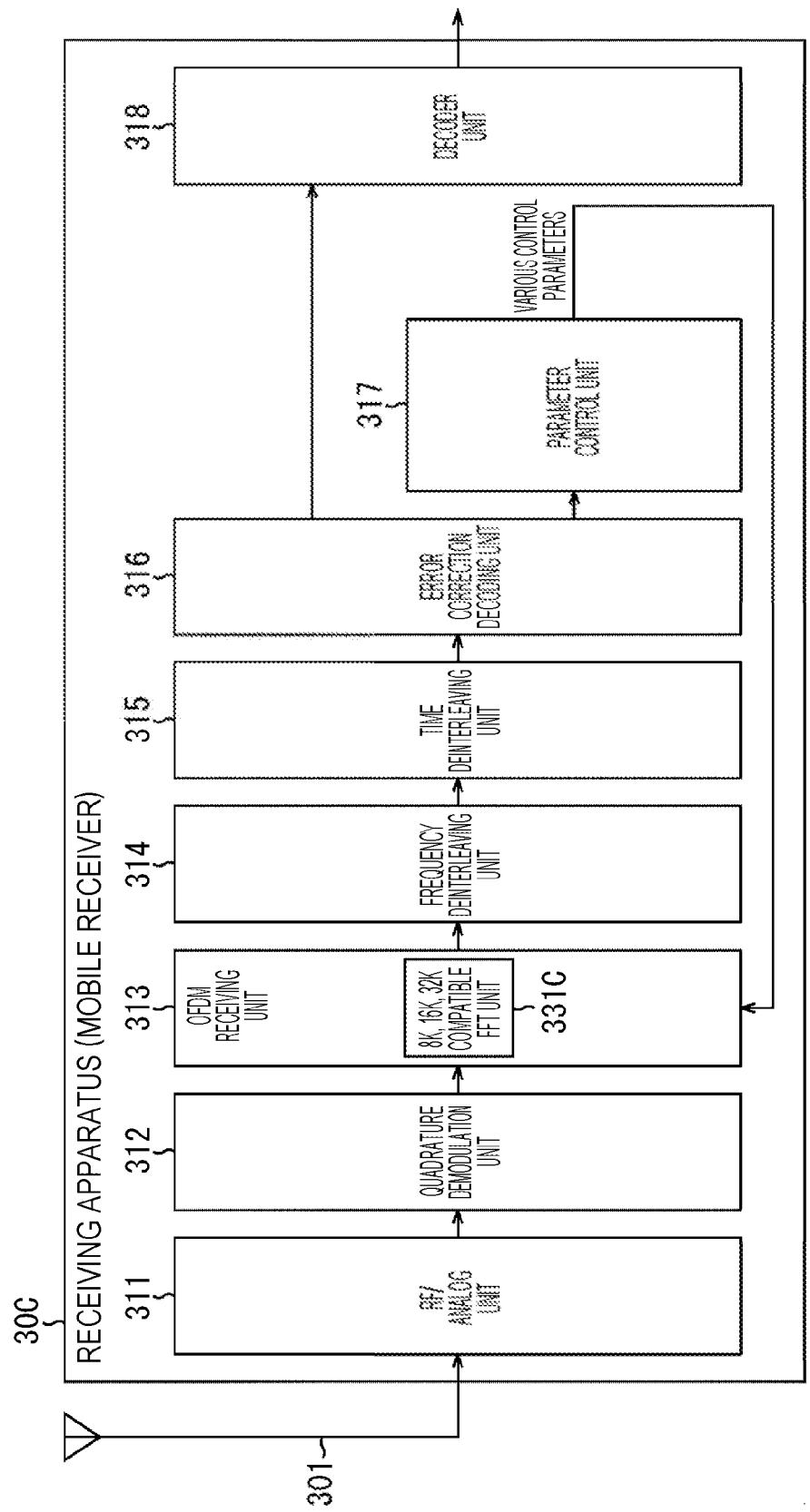
FIG. 22 is a diagram showing the configuration of an existing mobile receiver.

(Configuration of Existing Receiving Apparatus)
FIG. 22 is a diagram showing the configuration of an existing receiving apparatus 30C.

In the existing receiving apparatus 30C in FIG. 22, portions corresponding to those in the receiving apparatus 30A in FIG. 2 are denoted by the same reference signs, and the descriptions thereof will be omitted as appropriate.

That is, the existing receiving apparatus 30C is a mobile receiver such as a smartphone or the like, and an OFDM receiving unit 313 has an FFT unit 331C compatible with the FFT sizes of 8K, 16K and 32K. Therefore, in the OFDM receiving unit 313, the FFT unit 331C can perform the FFT operation with the FFT sizes of 8K and 16K for an OFDM time domain signal as a baseband signal.

(Flow of Demodulation Processing of Existing Mobile Receiver)
Next, the flow of the demodulation processing of the existing mobile receiver, which is executed by the receiving apparatus 30C in FIG. 22, will be described with reference to the flowchart in FIG. 23.

Figure 21:
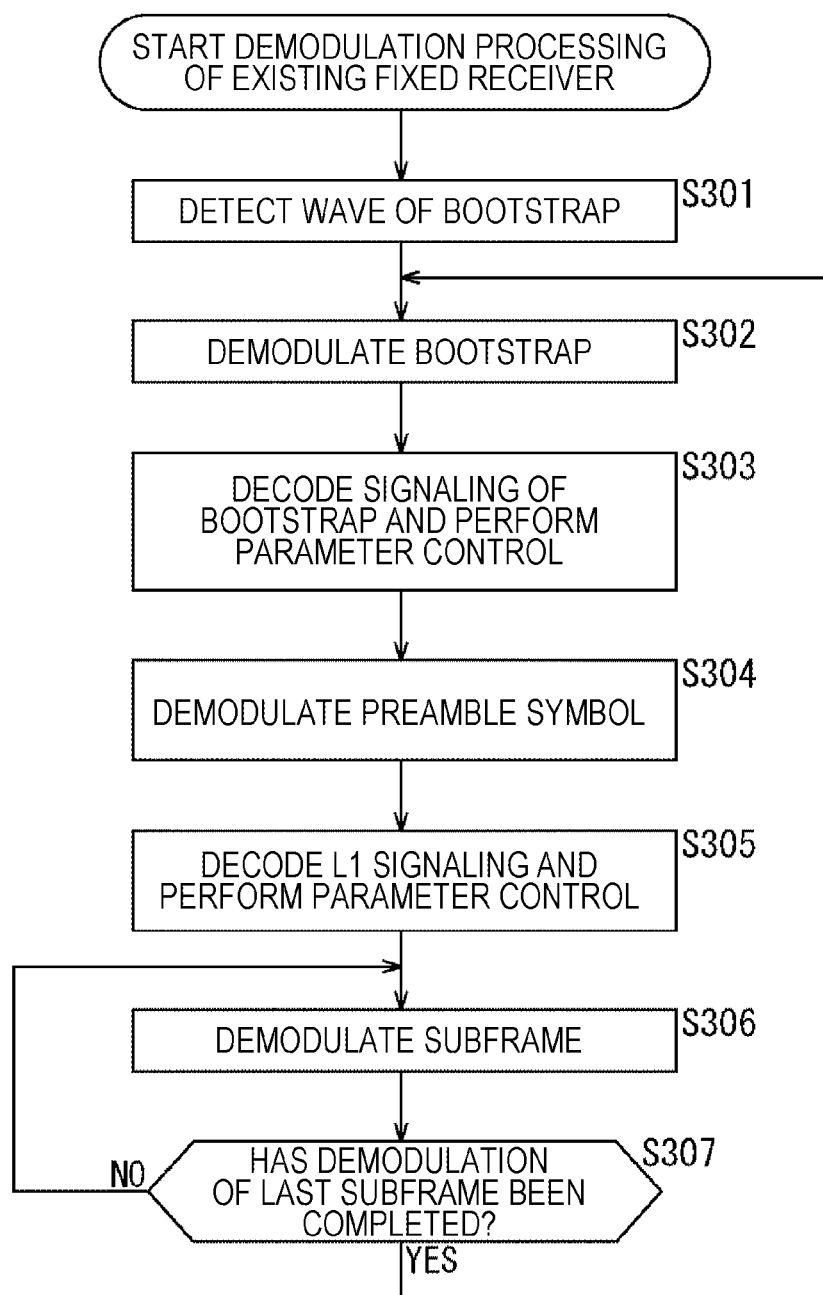
FIG. 21 is a flowchart for explaining a flow of demodulation processing of the existing fixed receiver.

Like Steps S301 to S305 in FIG. 21 previously mentioned, the bootstrap and preamble are demodulated by the OFDM receiving unit 313 and parameter control using the L1 signaling obtained from the preamble is performed in Steps S321 to S325.

In Step S326, it is determined whether the current subframe can be received. In a case where it is determined in Step S326 that the current subframe can be received, the processing proceeds to Step S327. In Step S327, the OFDM receiving unit 313 performs demodulation processing on the current subframe according to the parameter control by the processing in Step S325. When the processing in Step S327 ends, the processing proceeds to Step S329.

On the other hand, in a case where it is determined that the current subframe cannot be received, the processing proceeds to Step S328. In Step S328, the reception of the subframe section determined to be unreceivable by the determination processing in Step S326 is stopped. Then, when the next subframe is received after the reception of the subframe section is stopped by the processing in Step S328, the processing proceeds to Step S329.

In Step S329, it is determined whether the demodulation of the last subframe has been completed by performing the processing in Step S327 or S328. In a case where it is determined in Step S329 that the demodulation of the last subframe has not been completed, the processing returns to Step S326, and the processings in Steps S326 to S329 are repeated.

Then, in a case where it is determined in Step S329 that the demodulation of the last subframe included in the current physical layer frame has been completed, the processing returns to Step S322. Thereafter, the processings in Steps S322 to S329 described above are repeated with the next current physical layer frame.

The flow of the demodulation processing of the existing mobile receiver has been described above. In the demodulation processing of this mobile receiver, since there is no regularity in the FFT sizes of the subframes within the same physical layer frame, the next subframe is not necessarily unreceivable (unsupported FFT size) even in a case where the current subframe is unreceivable (unsupported FFT size) within the same physical layer frame. Thus, it is necessary to repeat the determination processing (S326 in FIG. 23) as to whether the reception is possible until the last subframe is to be processed. Therefore, in the existing receiving apparatus 30C (mobile receiver), the determination processing as to whether the reception is possible must be repeated although there is a possibility that the subframe cannot be received (unsupported FFT size), and wasteful electric power is consumed.

Moreover, since there is no regularity in the FFT sizes of the subframes within the same physical layer frame, in a case where the FFT size is large, the existing receiving apparatus 30C (mobile receiver) is susceptible to the influence of the Doppler shift, and there is a possibility that the reception performance is deteriorated. Furthermore, in the existing receiving apparatus 30C (mobile receiver), there is a possibility that the L1 signaling of the preamble cannot be decoded when the FFT size of the preamble of the physical layer frame is large, and the subframe cannot be demodulated in a case where the L1 signaling cannot be decoded.

As described above, since the control parameters such as the FFT size and the like can be arbitrarily set in the existing receiving apparatus 30C, the existing receiving apparatus 30C becomes susceptible to the influence of the Doppler shift depending on the settings, and the countermeasures against the Doppler shift were insufficient. Thereupon, the second embodiment proposes a method for setting control parameters which can suppress the influence of the Doppler shift. Note that, besides the method for suppressing the influence of the Doppler shift, the second embodiment also proposes that wasteful electric power consumption is prevented at the time of demodulating the subframe as well as that the L1 signaling of the preamble can be securely decoded.

(2) Method for Setting Control Parameters (Method for Setting Control Parameters)

Figure 24:
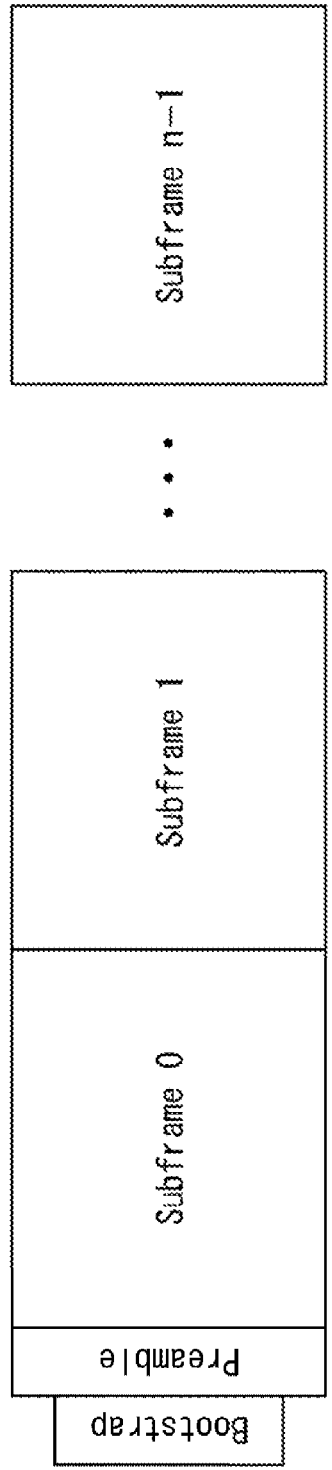
FIG. 24 is a diagram for explaining a method for setting control parameters of each subframe.

FIG. 24 is a diagram for explaining a method for setting control parameters of each subframe.

FIG. 24 shows a case where i number (i=0, 1, to n−1) of subframes are included in the physical layer frame. In the present technology, in a case where the effective symbol length of each subframe is $Tu_i$ in the physical layer frame, the control parameters are set so as to meet the relationship in the following Expression (6).

[Expression 6]

$$Tu_0 \leq Tu_1 \leq \ldots \leq Tu_{n-1} \quad (6)$$

That is, since the effective symbol length ($Tu_i$) is a value corresponding to the FFT size, by meeting the relationship in the above Expression (6), the control parameters are set so that the subframes are disposed in ascending order of the FFT size in each physical layer frame. For example, in each physical layer frame, by meeting the relationship in Expression (6), the FFT size of the subframe temporally earlier (e.g., Subframe 0) becomes equal to or a smaller size than the FFT size of the subframe temporally later (e.g., Subframe 1).

Moreover, in a case where the subframes are arranged in the physical layer frame collectively by subframe groups which are the collections of the subframes with the same FFT size, these subframe groups can be led to be disposed in ascending order of the FFT size from the above Expression (6).

However, in case of including the preamble besides the subframes, the FFT size of the preamble is made equal to or smaller than the FFT size of the head subframe (Subframe 0). That is, when the effective symbol length of the preamble is $Tu_p$, the control parameters are set so as to meet the following Expression (7).

[Expression 7]

$$Tu_p \leq Tu_0 \quad (7)$$

That is, in this case, the FFT size of the preamble is the same size as or a smaller size than the smallest FFT size among the FFT sizes of the subframes included in the physical layer frame.

By thus setting the control parameters of each subframe included in the physical layer frame so as to meet the relationships in the above Expressions (6) and (7), the control parameters of each subframe for suppressing the influence of the Doppler shift are appropriately set. Thus, the influence of the Doppler shift can be suppressed. Moreover, although the details will be described later, by meeting the relationships in the above Expressions (6) and (7), it is possible to prevent wasteful electric power consumption at the time of demodulating the subframe and to securely decode the L1 signaling of the preamble.

(Example of Receivable Parameters for Each Receiver)

Figure 25:
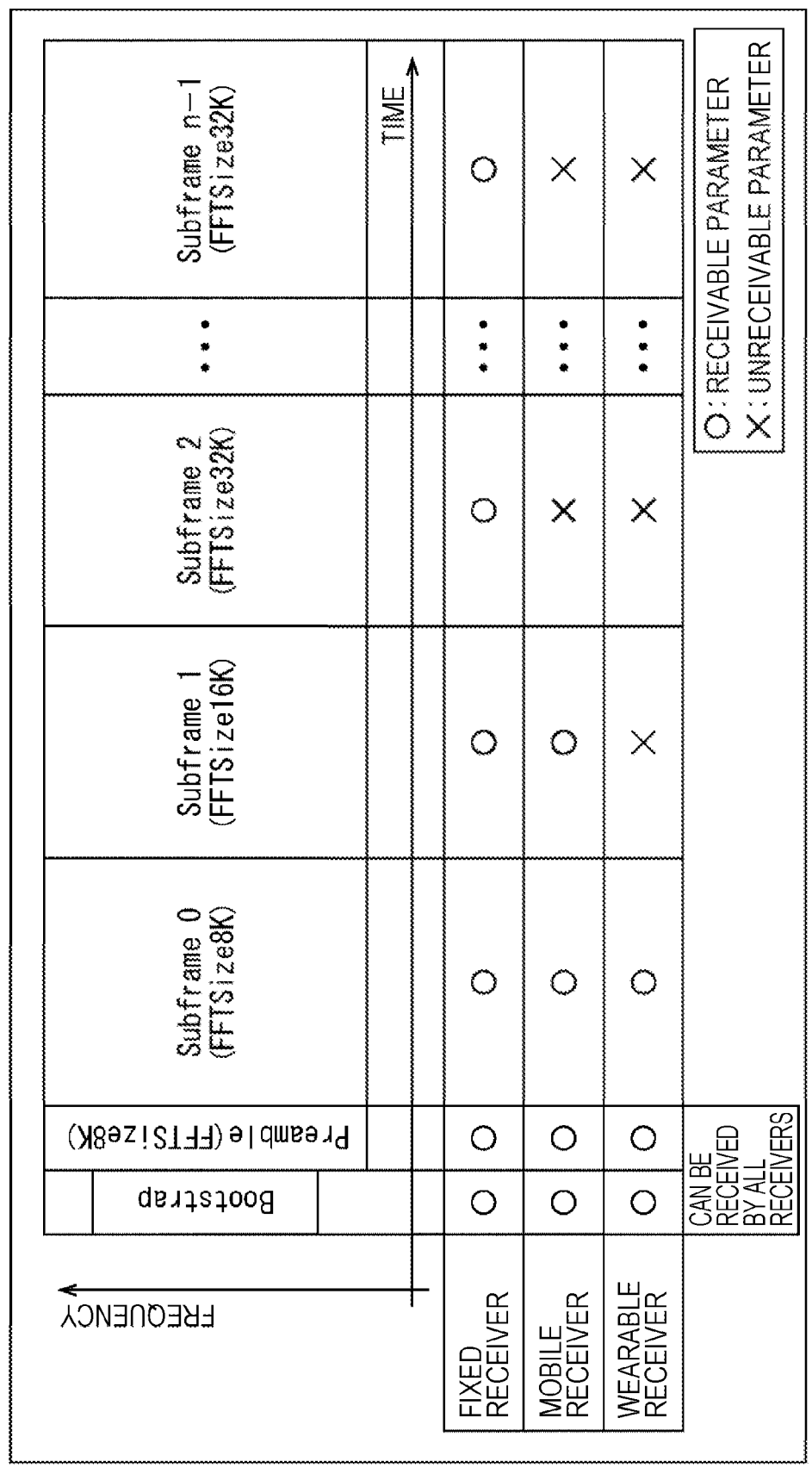
FIG. 25 is a diagram showing an example of receivable parameters of subframes for each of various receivers.

FIG. 25 is a diagram showing an example of receivable parameters of subframes for each of various receivers.

In FIG. 25, an FFT size of 8K is set in the head subframe (Subframe 0) and an FFT size of 16K is set in the second subframe (Subframe 1) in the physical layer frame so as to meet the relationship in the aforementioned Expression (6). Moreover, an FFT size of 32K is set in the third to i-th subframes (Subframes 2 to n−1) in the physical layer frame, and the relationship in the aforementioned Expression (6) is met. Note that the third to i-th subframes (Subframes 2 to n−1) have the same FFT size herein so that those subframes can be said to belong to the same subframe group.

Furthermore, the same FFT size as the head subframe (Subframe 0), that is, the FFT size of 8K is set in the preamble so as to meet the relationship in the aforementioned Expression (7). Note that the bootstrap is a known signal so that it is unnecessary to set an FFT size.

Herein, as described above, since the mobile receiver is susceptible to the influence of the Doppler shift, a smaller FFT size is suitable for the processing, whereas the fixed receiver is demanded to be compatible with a larger FFT size such as 32K or the like for the purpose of providing a broadcast program with a larger amount of information, and the like. Note that, larger the FFT size, longer the effective symbol length of the OFDM signal so that the transmission capacity can be expanded.

That is, the fixed receiver needs to be compatible with a larger FFT size, but the mobile receiver does not need to be compatible with a larger FFT size, for example, 32K and the like in consideration of the influence of the Doppler shift and can limit the receivable FFT size. Further, wearable terminals which can be directly worn by a user to be taken along, such as a wristwatch type and eyeglass type, have been attracting attention in recent years. In addition, in a case of using this type of wearable terminal as a receiver (wearable receiver), the receivable FFT size can be limited (further limited), like the mobile receiver.

Therefore, in a case where FFT sizes of 8K, 16K and 32K can be set, the FFT sizes compatible with the fixed receiver, the mobile receiver and the wearable receiver have the relationships shown in FIG. 25. That is, in FIG. 25, the fixed receiver can be compatible with all the FFT sizes of 8K, 16K and 32K. Thus, the fixed receiver can demodulate all the first to i-th subframes (Subframes 0 to n−1) after demodulating the bootstrap and preamble.

Moreover, the mobile receiver can be compatible with the FFT sizes of 8K and 16K. Thus, the mobile receiver can demodulate the first and second subframes (Subframes 0 and 1) after demodulating the bootstrap and the preamble. Furthermore, the wearable receiver can be compatible with only the FFT size of 8K. Thus, the wearable receiver can demodulate only the head subframe (Subframe 0) after demodulating the bootstrap and preamble.

By thus limiting the compatible FFT sizes in the mobile receivers and the wearable receiver, the influence of the Doppler shift can be suppressed. In addition, by limiting the compatible FFT sizes, for example, reduction of memories used for the FFT operation can be realized in the mobile receivers and the wearable receivers. Thus, the manufacturing costs of the mobile receiver and the like can be lowered.

Moreover, since two or more subframes included in the physical layer frame are disposed in ascending order of the FFT size, the processing can be stopped in the mobile receiver and the wearable receiver until the next physical layer frame is processed after the processing on the subframe receivable by itself is completed. Thus, high efficiency and simplification of control can be realized while electric power consumption is reduced. Furthermore, since the FFT size of the preamble is equal to or smaller than the FFT size of the head subframe, the L1 signaling of the preamble can also be securely decoded.

(3) System Configuration (Configuration Example of Transmission System)

Figure 26:
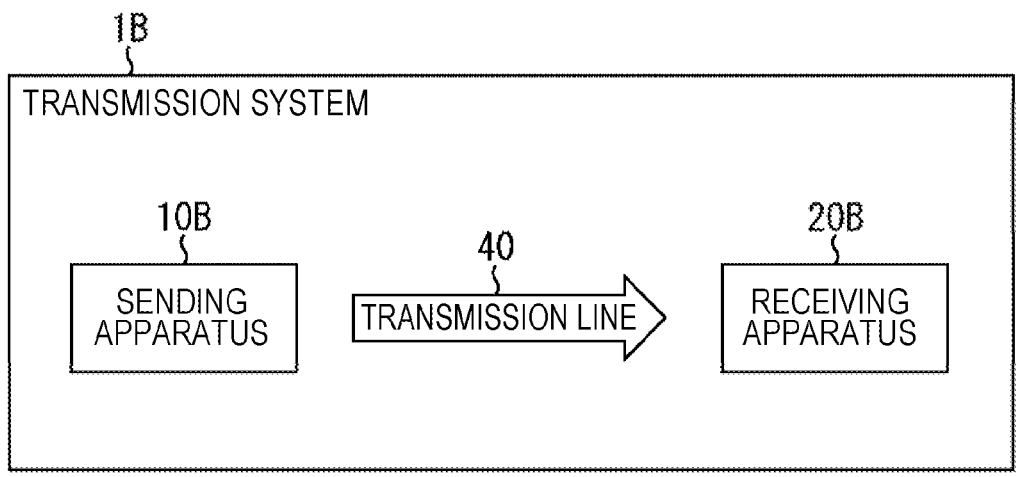
FIG. 26 is a diagram showing the configuration of one embodiment of a transmission system to which the present technology is applied.

FIG. 26 is a diagram showing the configuration of one embodiment of a transmission system to which the present technology is applied.

In a transmission system 1B in FIG. 26, portions corresponding to those in the transmission system 1A in FIG. 13 are denoted by the same or corresponding reference signs, and the descriptions thereof will be omitted as appropriate.

In FIG. 26, the sending apparatus 10B is configured similarly to the sending apparatus 10A in FIG. 13. The sending apparatus 10B sends the contents (e.g., a broadcast program or the like) via a transmission line 40.

The receiving apparatus 20B is a mobile receiver such as a smartphone and is configured similarly to the receiving apparatus 20A in FIG. 13. The receiving apparatus 20B receives and outputs the contents (e.g., a broadcast program or the like) sent from the sending apparatus 10B via the transmission line 40.

(Configuration Example of Sending Apparatus)

Figure 27:
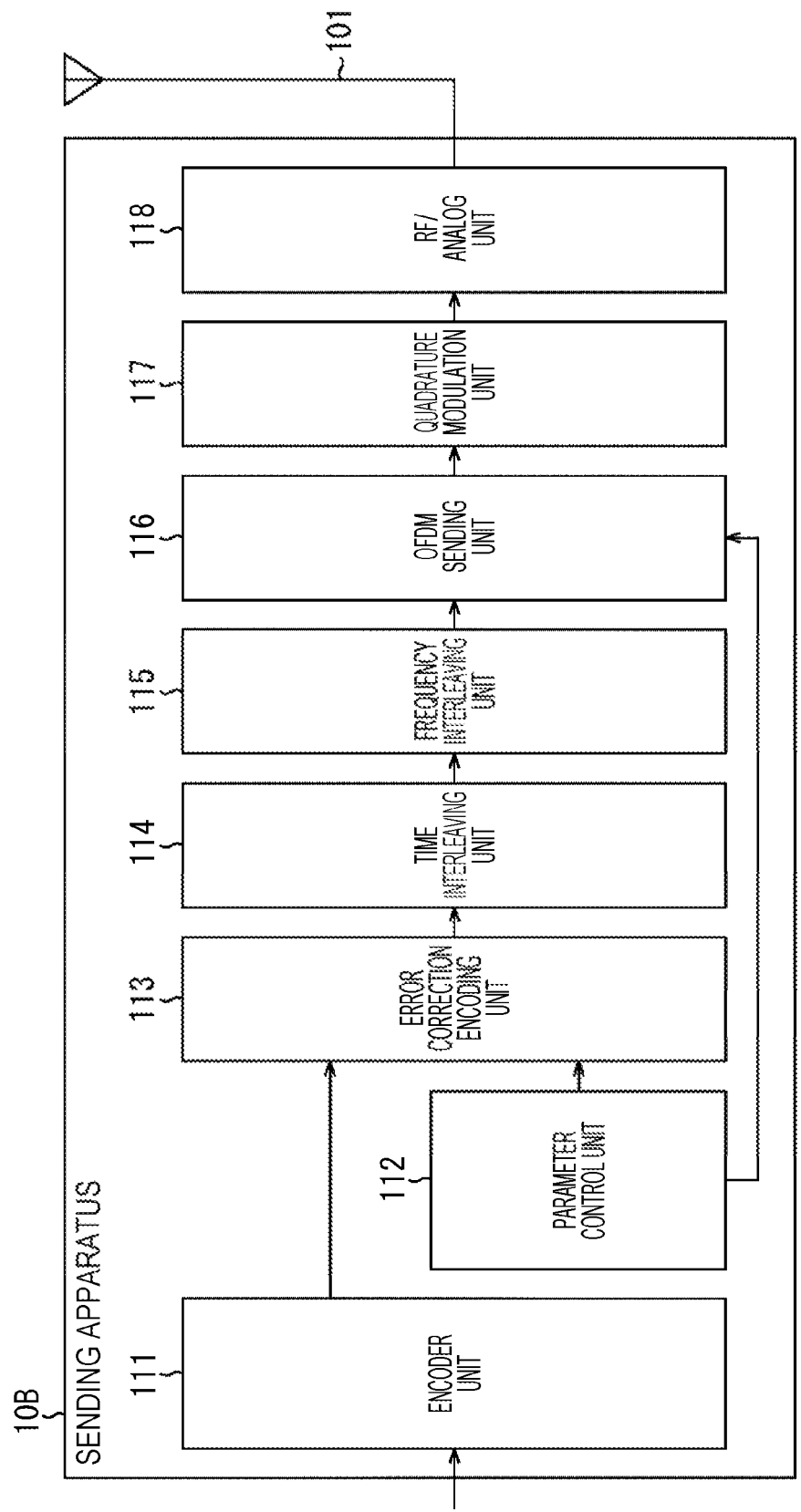
FIG. 27 is a diagram showing a configuration example of the sending apparatus according to the present technology.

FIG. 27 is a diagram showing a configuration example of the sending apparatus 10B in FIG. 26.

In the sending apparatus 10B in FIG. 27, portions corresponding to those in the sending apparatus 10A in FIG. 14 are denoted by the same reference signs, and the descriptions thereof will be omitted as appropriate.

A parameter control unit 112 supplies control parameters of each subframe included in the physical layer frame to an OFDM sending unit 116. The OFDM sending unit 116 performs modulation processing on each subframe included in the physical layer frame according to the control parameters from the parameter control unit 112.

Herein, the control parameters include the FFT size of each subframe, and the OFDM sending unit 116 processes the subframes and the preamble arranged in the physical layer frame so as to meet the relationships in the aforementioned Expressions (6) and (7) so that the preamble and the subframes (subframe groups) are disposed in ascending order of the FFT size in each physical layer frame.

(Flow of Modulation Processing on Sending Side of Present Technology)

Figure 28:
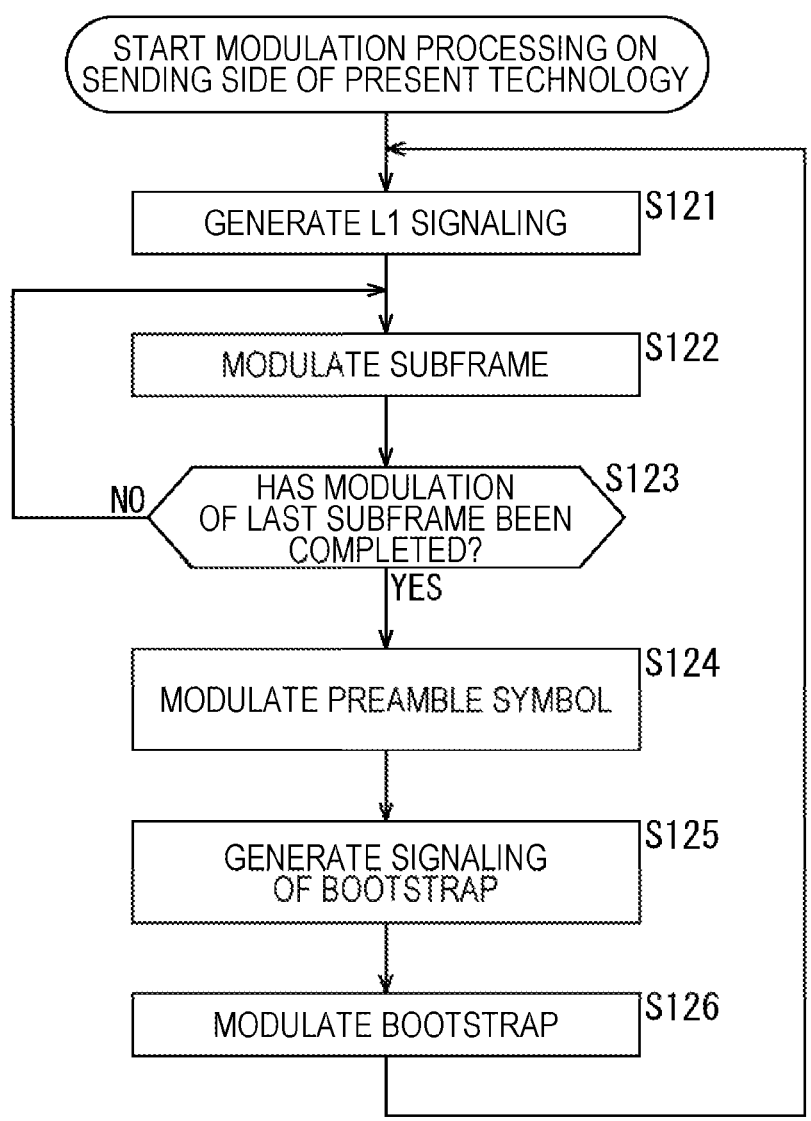
FIG. 28 is a flowchart for explaining a flow of modulation processing on the sending side of the present technology.

Next, the flow of the modulation processing on the sending side of the present technology, which is executed by the sending apparatus 10B in FIG. 26, will be described with reference to the flowchart in FIG. 28. Note that, in the description with FIG. 28, the processings executed by the parameter control unit 112 and the OFDM sending unit 116 will be mainly described.

Figure 15:
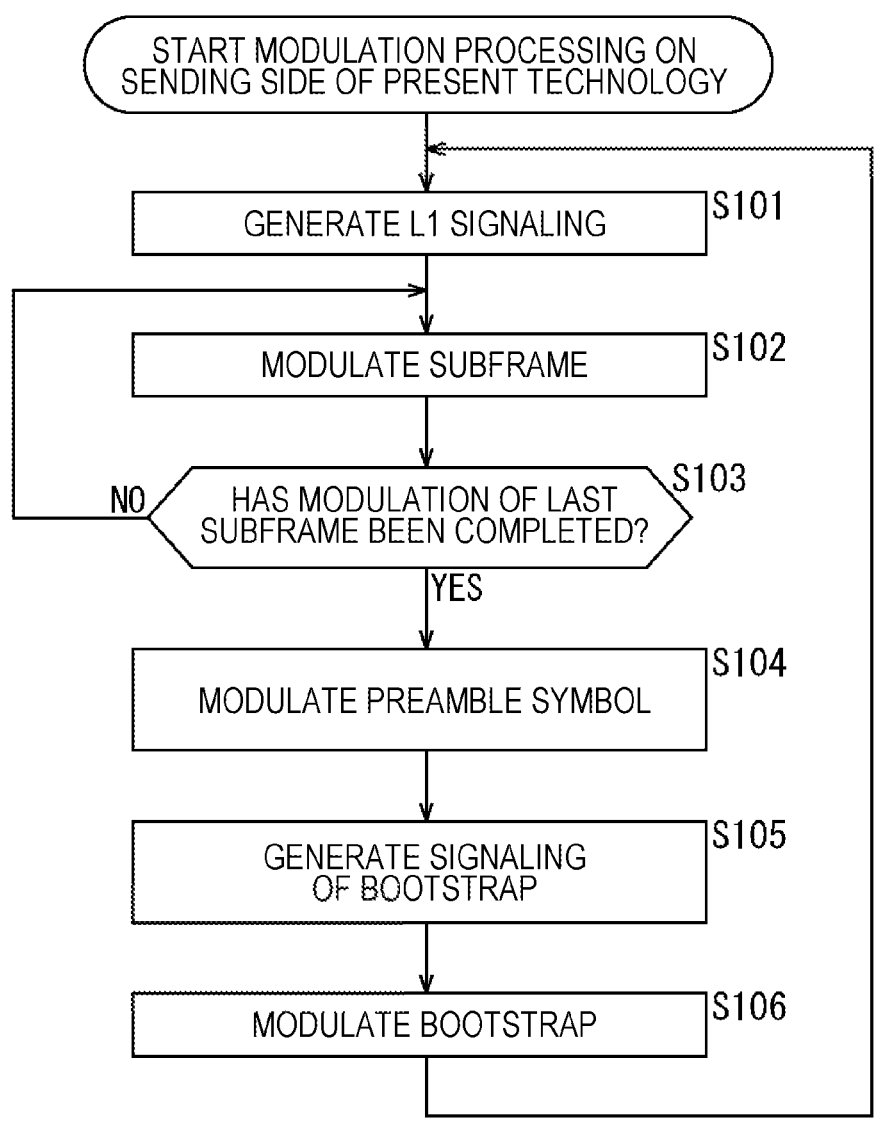
FIG. 15 is a flowchart for explaining a flow of modulation processing on the sending side of the present technology.

Like Steps S101 to S106 in FIG. 15, modulation processing is performed on the physical layer frame in Steps S121 to S126, but the setting contents of the control parameters used for the modulation processing on each subframe are different.

That is, by the processing in Step S122, the OFDM sending unit 116 performs the modulation according to the control parameters (FFT sizes) so as to meet the relationship in the aforementioned Expression (6) so that the subframes (subframe groups) arranged in the physical layer frame are arranged in ascending order of the FFT sizes. Moreover, by the processing in Step S124, the OFDM sending unit 116 performs the modulation according to the control parameters (FFT sizes) so as to meet the relationship in the aforementioned Expression (7) so that the FFT size of the preamble is equal to or smaller than the FFT size of the head subframe.

The flow of the modulation processing on the sending side of the present technology has been described above. In this modulation processing on the sending side of the present technology, in each physical layer frame, the subframes (subframe groups) are disposed in ascending order of the FFT sizes, and the FFT size of the preamble is set to be the same size as or a smaller size than the smallest FFT size among the FFT sizes of the subframes.

(Configuration Example of Receiving Apparatus)

Figure 29:
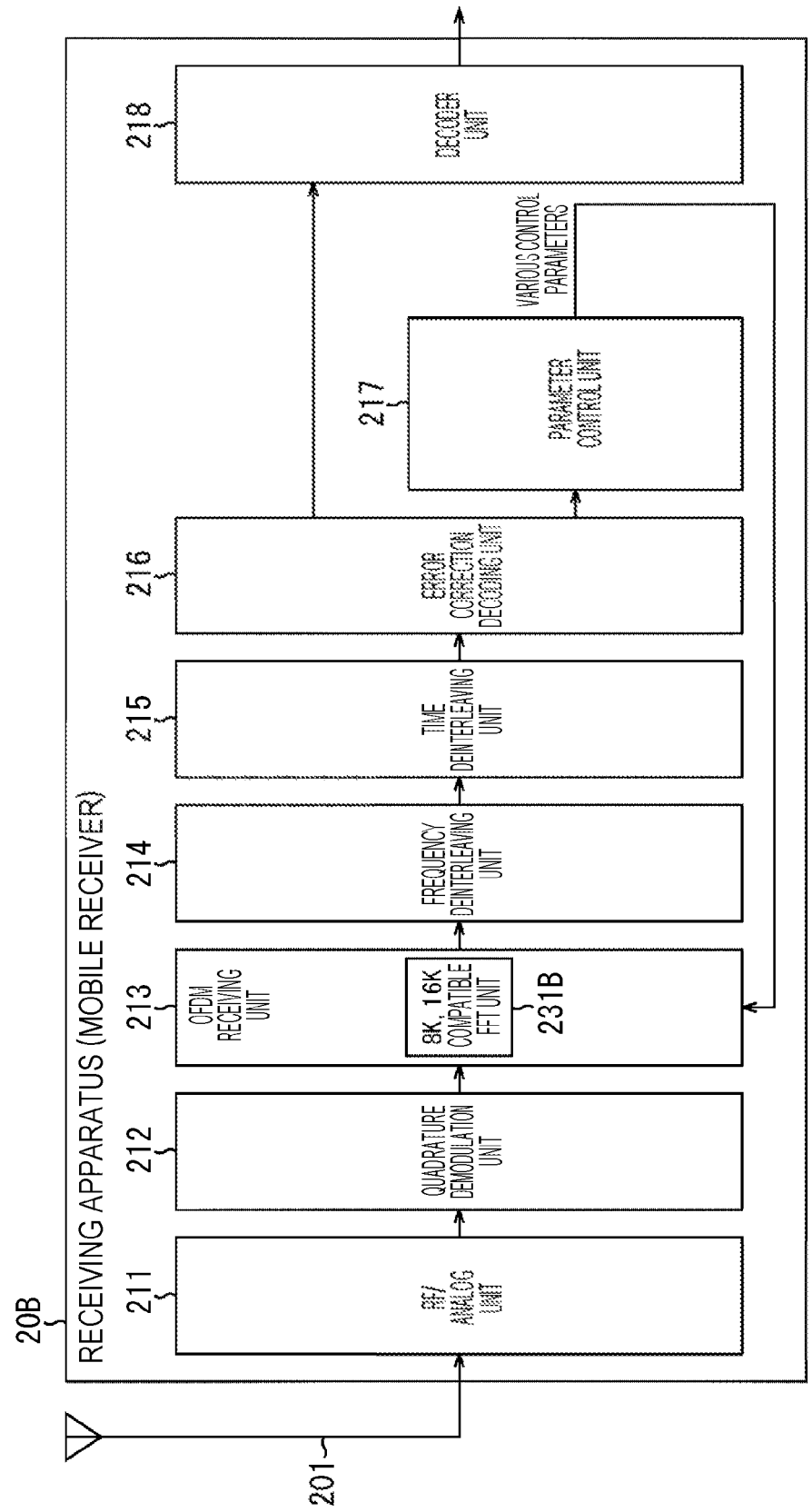
FIG. 29 is a diagram showing a configuration example of the receiving apparatus (mobile receiver) according to the present technology.

FIG. 29 is a diagram showing a configuration example of the receiving apparatus 20B in FIG. 26.

In the receiving apparatus 20B in FIG. 29, portions corresponding to those in the receiving apparatus 20A in FIG. 16 are denoted by the same reference signs, and the descriptions thereof will be omitted as appropriate.

A parameter control unit 217 supplies control parameters of each subframe included in the physical layer frame to an OFDM receiving unit 213. The OFDM receiving unit 213 performs demodulation processing on each subframe included in the physical layer frame according to the control parameters from the parameter control unit 217.

Moreover, the OFDM receiving unit 213 has an FFT unit 231B compatible with the FFT sizes of 8K and 16K. Therefore, in the OFDM receiving unit 213, the FFT unit 231B can perform the FFT operation with the FFT sizes of 8K and 16K for an OFDM time domain signal as a baseband signal.

Herein, since the subframes (subframe groups) arranged in the physical layer frame are arranged in ascending order of the FFT sizes and further, the FFT unit 231B is compatible with only the FFT sizes of 8K and 16K, the possibility of being influenced by the Doppler shift as when being compatible with a larger FFT size (e.g., the FFT size of 32K) is reduced.

Moreover, since the subframes (subframe groups) arranged in the physical layer frame are arranged in ascending order of the FFT sizes, the FFT unit 231B is compatible with only the FFT sizes of 8K and 16K. However, it is possible to securely perform the demodulation processing on the subframes with the FFT sizes of 8K and 16K arranged closer to the head by processing the subframes of the physical layer frame in order from the head.

Furthermore, since the FFT size of the preamble is set to the same size as or a smaller size than the smallest FFT size among the FFT sizes of the subframes, even the FFT unit 231B compatible with the FFT sizes of 8K and 16K can also securely decode the L1 signaling of the preamble.

(Flow of Demodulation Processing on Receiving Side of Present Technology)

Figure 30:
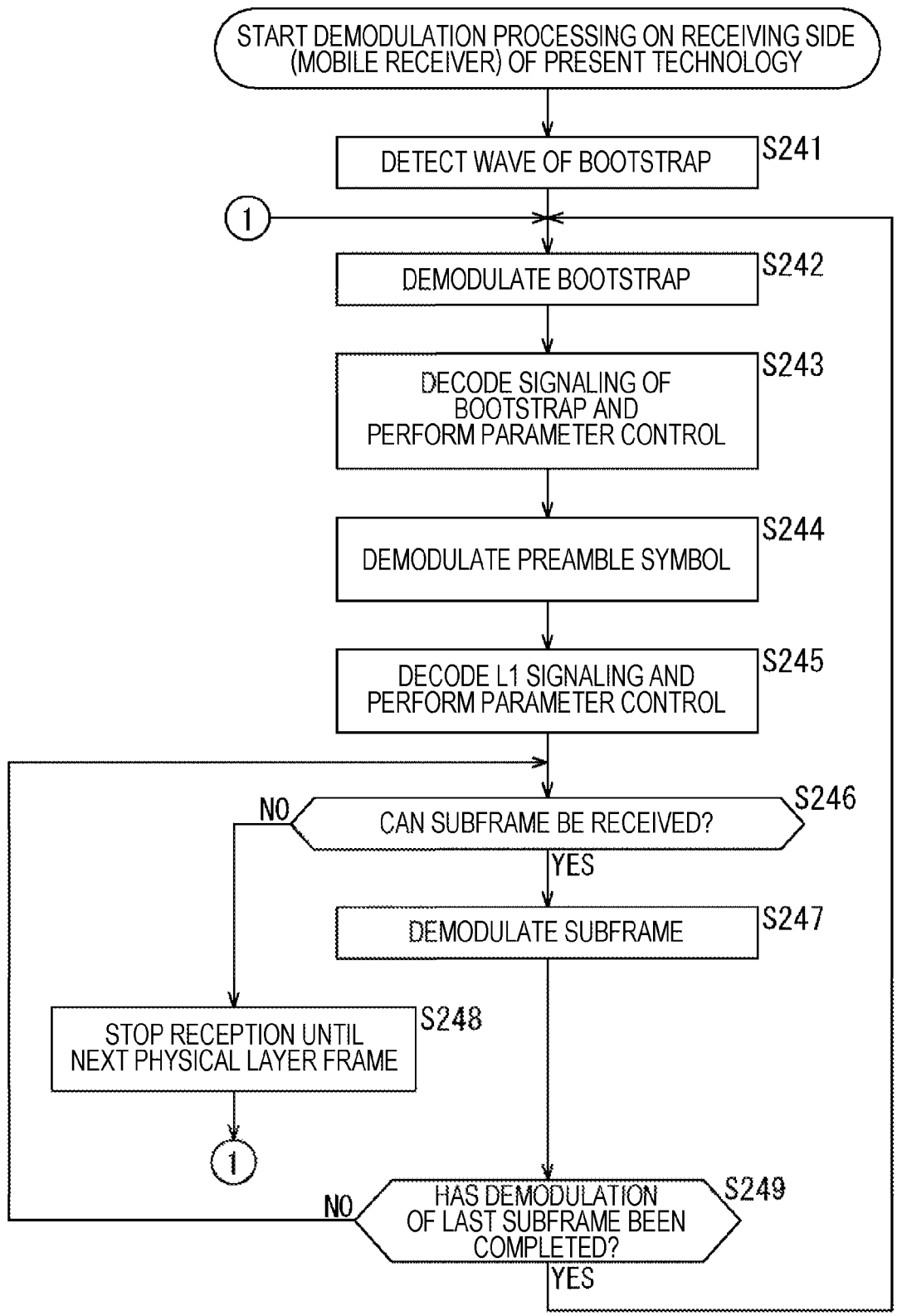
FIG. 30 is a flowchart for explaining a flow of demodulation processing on the receiving side (mobile receiver) of the present technology.

Next, the flow of the demodulation processing on the receiving side of the present technology, which is executed by the receiving apparatus 20B in FIG. 26, will be described with reference to the flowchart in FIG. 30. However, in the description with FIG. 30, the processings executed by the OFDM receiving unit 213 and the parameter control unit 217 will be mainly described.

Figure 17:
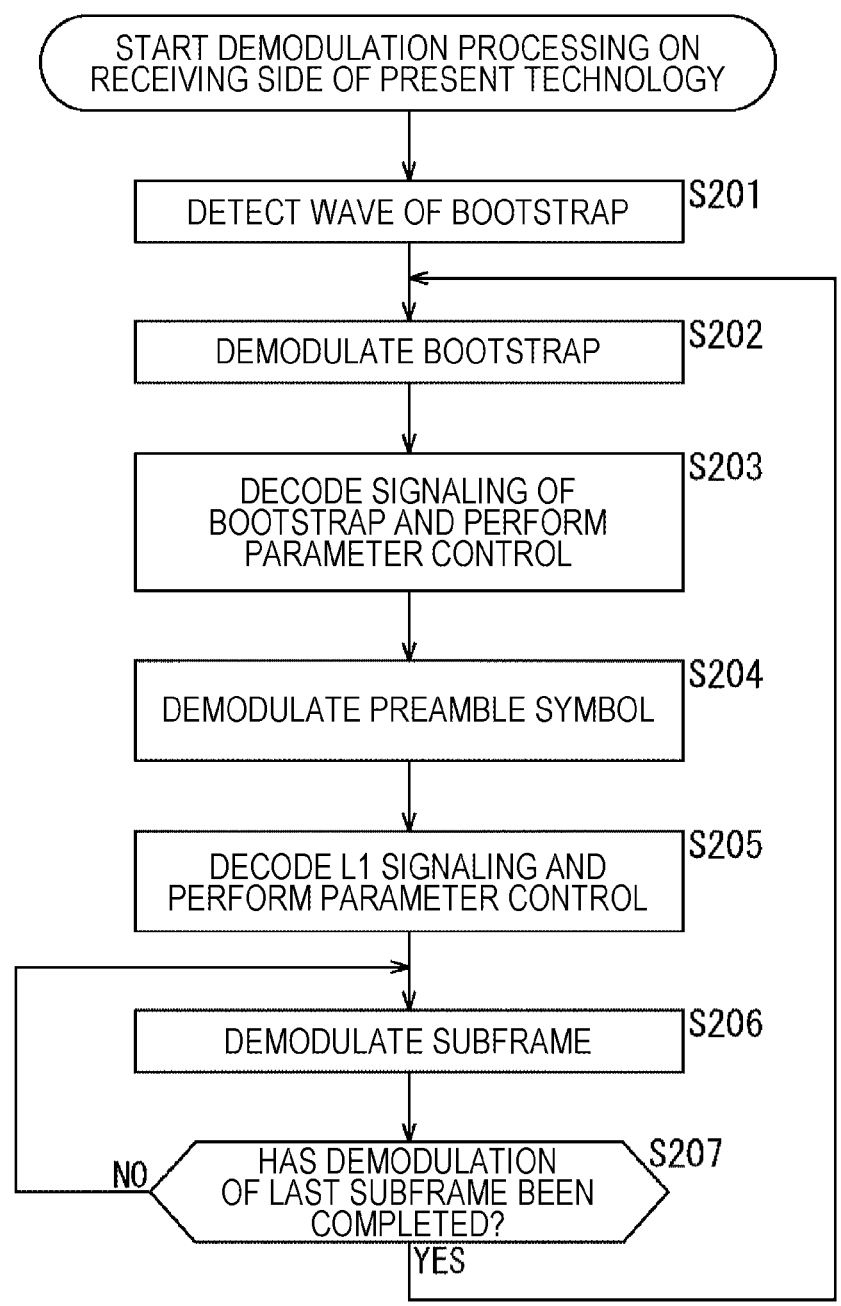
FIG. 17 is a flowchart for explaining a flow of demodulation processing on the receiving side of the present technology.

Like Steps S201 to S205 in FIG. 17, demodulation processing is performed on the bootstrap and the preamble included in the physical layer frame in Steps S241 to S245.

In Step S246, it is determined whether the current subframe can be received. In a case where it is determined in Step S246 that the current subframe can be received, the processing proceeds to Step S247. In Step S247, the OFDM receiving unit 213 performs demodulation processing on the current subframe according to the parameter control by the processing in Step S245.

On the other hand, in a case where it is determined that the current subframe cannot be received, the processing proceeds to Step S248. In Step S248, the reception of the physical layer frame (subframe) is stopped from the subframe determined to be unreceivable by the determination processing in Step S246 until the head (bootstrap) of the next physical layer frame. Then, when the next physical layer frame is received after the reception of the physical layer frame is stopped by the processing in Step S248, the processing returns to Step S242, and the subsequent processings are repeated with the next current physical layer frame.

Moreover, when the processing in Step S247 ends, the processing proceeds to Step S249. In Step S249, it is determined whether the demodulation of the last subframe included in the current physical layer frame has been completed. In a case where it is determined in Step S249 that the demodulation of the last subframe has not been completed, the processing returns to Step S246, and the processings in Steps S246 to S249 are repeated.

Then, in a case where it is determined in Step S249 that the demodulation of the last subframe included in the current physical layer frame has been completed ("YES" in S249) or in a case where the current subframe is determined to be unreceivable and the next physical layer frame is received by stopping the reception of the current physical layer frame ("NO" in S246, S248), the processing returns to Step S242. Thereafter, the processings in Steps S242 to S249 described above are repeated with the next current physical layer frame.

That is, in the second embodiment, since the subframes (subframe groups) are disposed in ascending order of the FFT sizes in the same physical layer frame, when a certain subframe is unreceivable (unsupported FFT size), the subsequent subframes are also unreceivable (unsupported FFT sizes). Thus, the receiving apparatus 20B stops the reception of the physical layer frame (subframe) until the next physical layer frame is received.

Figure 23:
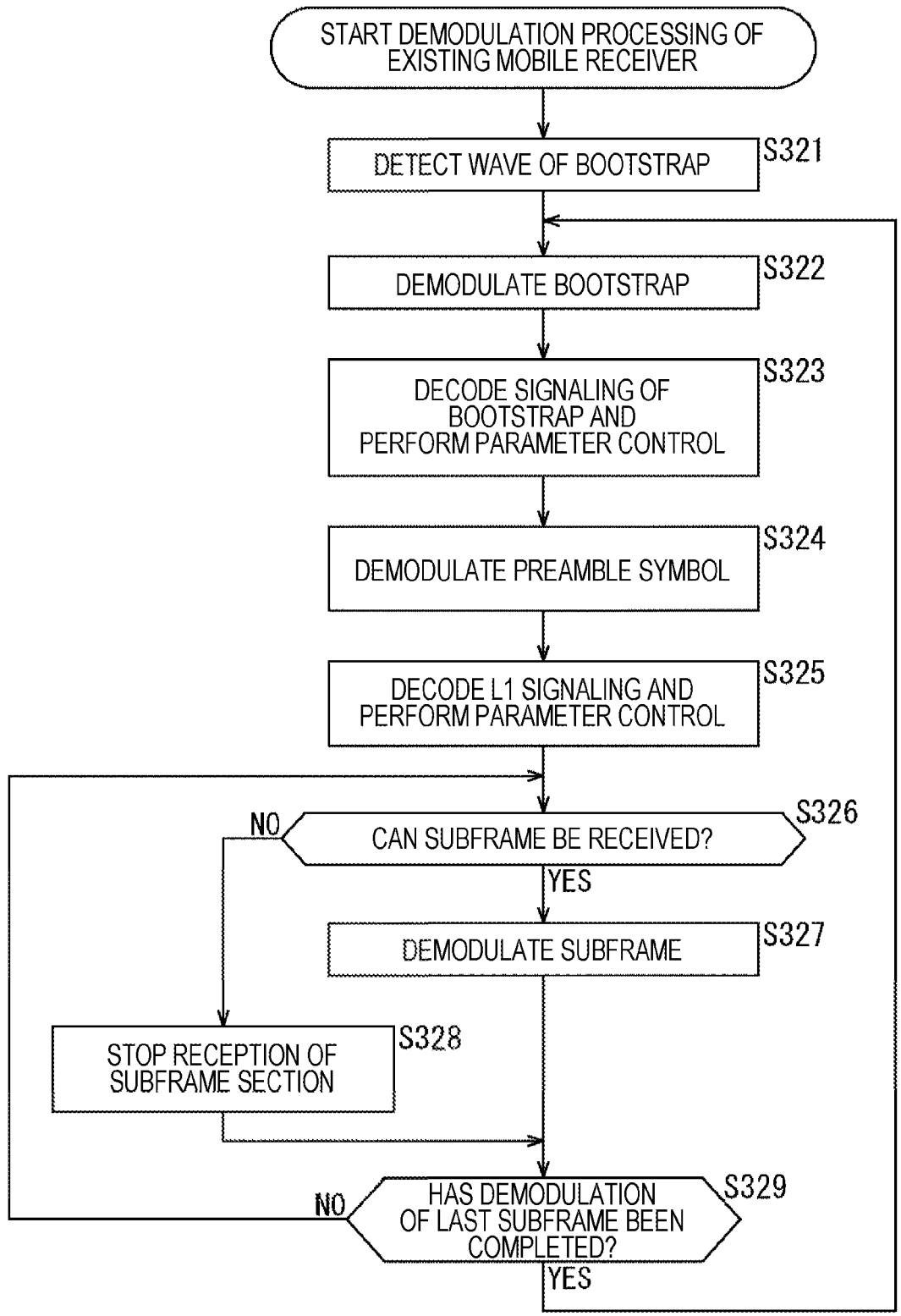
FIG. 23 is a flowchart for explaining a flow of demodulation processing of the existing mobile receiver.

In this regard, in a case where it is determined that the current subframe cannot be received ("No" in S326 in FIG. 23) in the existing receiving apparatus 30C (FIG. 22), the reception is stopped only for the section of the subframe (S328 in FIG. 23). When the next subframe is received, the determination processing as to whether the reception is possible is performed again on the next current subframe (S326 in FIG. 23). This is because, since there is no regularity in the FFT sizes of the subframes within the same physical layer frame, the next subframe is not necessarily unreceivable (unsupported FFT size) even in a case where the current subframe is unreceivable (unsupported FFT size) within the same physical layer frame. Thus, it is necessary to repeat the determination processing (S326 in FIG. 23) as to whether the reception is possible until the last subframe is to be processed.

Therefore, in the receiving apparatus 20B (FIG. 29) of the present technology, the reception of the physical layer frame can be stopped after the demodulation of the receivable subframes in the same physical layer frame is completed until the next physical layer frame is received. However, in the existing receiving apparatus 30C (FIG. 22), whether the demodulation of the receivable subframes in the same physical layer frame has been completed is unknown until the demodulation of the last subframe is completed. Thus, it is necessary to process all the subframes.

The flow of the demodulation processing on the receiving side of the present technology has been described above. In the demodulation processing on the receiving side of the present technology, since the subframes (subframe groups) are disposed in ascending order of the FFT sizes in each physical layer frame, the reception of the physical layer frame can be stopped after the demodulation of the receivable subframes (subframe groups) is completed until the next physical layer frame is received. Therefore, it is possible for the receiving apparatus 20B to suppress wasteful electric power consumption for receiving an unreceivable subframe (unsupported FFT size).

By thus disposing the preamble and the subframes (subframe groups) in ascending order of the FFT sizes in each physical layer frame so as to meet the relationships in the aforementioned Expressions (6) and (7), it is possible to suppress the influence of the Doppler shift in the second embodiment. In addition, in the receiving apparatus 20B, it is possible to prevent wasteful electric power consumption and securely decode the L1 signaling of the preamble.

4. Modification Example

In the above description, ATSC (in particular, ATSC 3.0), which is a system adopted in the United States and elsewhere, has been described as a standard for digital broadcasting, but the present technology can also be applied to integrated services digital broadcasting (ISDB) which is a system adopted in Japan and elsewhere, digital video broadcasting (DVB) which is adopted in various countries in Europe and elsewhere, and the like. Moreover, in the above description, ATSC 3.0 adopting the IP transmission system has been described as an example, but the present technology is not limited to the IP transmission system and may be applied to other systems such as the MPEG2-Transport Stream (TS) system and the like, for example.

Furthermore, besides terrestrial broadcasting, the standard for digital broadcasting can be applied to the standards targeting satellite broadcasting using a broadcasting satellite (BS), a communication satellite (CS) or the like, and cable broadcasting such as cable television (CATV) or the like.

Further, the present technology can be applied to transmission lines such as transmission lines other than the broadcasting network, that is, for example, predetermined standards (standards other than digital broadcast standard) and the like defined on the presumption that communication lines (communication networks) and the like such as the Internet, a telephone network and the like are used. In that case, a communication line such as the Internet or a telephone network is used as the transmission line 40 of the transmission system 1A or 1B (FIG. 13, FIG. 26), and the sending apparatus 10A or 10B can be a server provided on the Internet. Then, by making the receiving apparatus 20A or 20B have a communication function, the sending apparatus 10A or 10B (server) performs the processing in response to a request from the receiving apparatus 20A or 20B. On the other hand, the receiving apparatus 20A or 20B processes data sent from the sending apparatus 10A or 10B (server) via the transmission line 40 (communication line).

5. Computer Configuration

Figure 31:
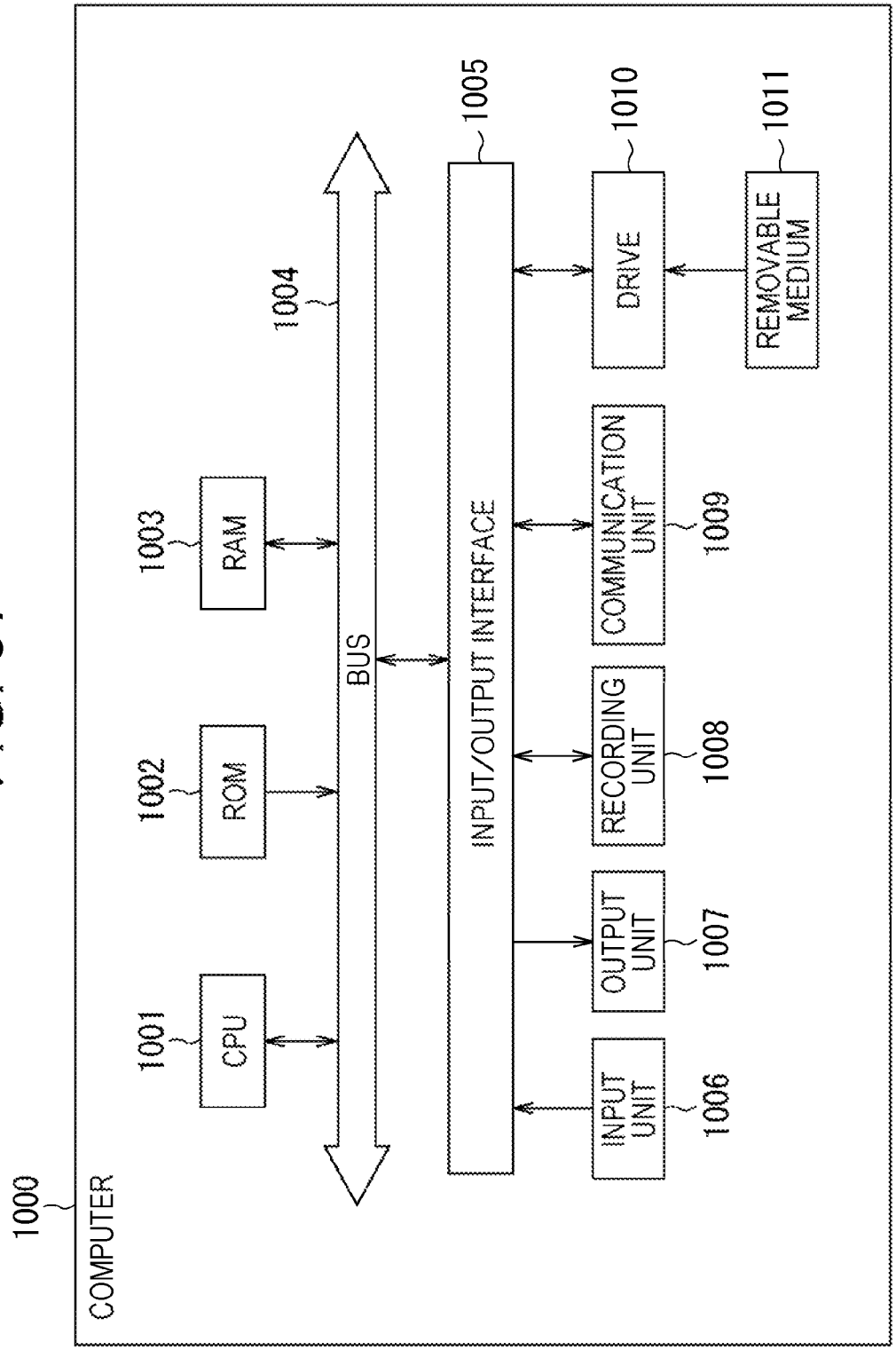
FIG. 31 is a diagram showing a configuration example of a computer.

The series of processings described above can be executed by hardware or can be executed by software. In a case where the series of processings is executed by the software, a program configuring that software is installed in a computer. FIG. 31 is a diagram showing a configuration example of hardware of a computer which executes the aforementioned series of processings by a program.

In a computer 1000, a central processing unit (CPU) 1001, a read only memory (ROM) 1002 and a random access memory (RAM) 1003 are connected to each other by a bus 1004. The bus 1004 is further connected to an input/output interface 1005. To the input/output interface 1005, an input unit 1006, an output unit 1007, a recording unit 1008, a communication unit 1009 and a drive 1010 are connected.

The input unit 1006 includes a keyboard, a mouse, a microphone and the like. The output unit 1007 includes a display, a speaker and the like. The recording unit 1008 includes a hard disk, a nonvolatile memory and the like. The communication unit 1009 includes a network interface and the like. The drive 1010 drives a removable medium 1011 such as a magnetic disk, an optical disk, a magneto-optical disk or a semiconductor memory.

In the computer 1000 configured as described above, the CPU 1001 loads a program recorded in the ROM 1002 or the recording unit 1008 into the RAM 1003 via the input/output interface 1005 and the bus 1004 and executes the program, thereby performing the aforementioned series of processings.

The program executed by the computer 1000 (CPU 1001) can be, for example, recorded on the removable medium 1011 as a package medium or the like to be provided. Moreover, the program can be provided via a wired or wireless transmission medium such as a local area network, the Internet and digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via the wired or wireless transmission medium and installed in the recording unit 1008. In addition, the program can be installed in the ROM 1002 or the recording unit 1008 in advance.

Herein, in this specification, the processings performed by the computer according to the program do not have to be necessarily performed in time series along the order described in the flowcharts. That is, the processings performed by the computer according to the program also include processings which are executed in parallel or individually (e.g., parallel processing or processing by an object). Moreover, the program may be processed by one computer (processor) or may be distributed to be processed by a plurality of computers.

Note that the embodiments of the present technology are not limited to the above embodiments, and various modifications can be made in a scope without departing from the gist of the present technology.

Moreover, the present technology can also adopt the following configurations.

(1)

A data processing apparatus including:

a processing unit which performs modulation processing on a physical layer frame including a preamble, which includes a modulation parameter, and one or more subframes, which include data, in which any modulation parameter can be set for each of the subframes, and the subframes are arranged in the physical layer frame collectively by subframe groups which are collections of the subframes with FFT sizes, which are same, when inverse fast Fourier transform (IFFT) operation is performed on symbols included in the physical layer frame.

(2)

The data processing apparatus according to (1), in which the subframe groups are disposed in ascending order of the FFT sizes in the physical layer frame.

(3)

The data processing apparatus according to (2), in which an FFT size of the preamble is a same size as or a smaller size than a smallest FFT size among the FFT sizes of the subframes included in the physical layer frame.

(4)

The data processing apparatus according to (1), in which the subframe groups are disposed in descending order of the FFT sizes in the physical layer frame.

(5)

The data processing apparatus according to (4), in which an FFT size of the preamble is a same size as or a larger size than a largest FFT size among the FFT sizes of the subframes included in the physical layer frame.

(6)

The data processing apparatus according to any one of (1) to (5), in which the FFT sizes represent numbers of current samples for one IFFT operation.

(7)

The data processing apparatus according to any one of (1) to (6), in which a modulation method of a signal processed in the modulation processing is orthogonal frequency division multiplexing (OFDM), and the physical layer frame includes a plurality of OFDM symbols.

(8)

A data processing method of a data processing apparatus, the method including:

a step of performing modulation processing on a physical layer frame including a preamble, which includes a modulation parameter, and one or more subframes, which include data, by the data processing apparatus, in which any modulation parameter can be set for each of the subframes, and the subframes are arranged in the physical layer frame collectively by subframe groups which are collections of the subframes with FFT sizes, which are same, when IFFT operation is performed on symbols included in the physical layer frame.

(9)

A data processing apparatus including:

a processing unit which performs demodulation processing on a physical layer frame including a preamble, which includes a demodulation parameter, and one or more subframes, which include data, in which any demodulation parameter can be set for each of the subframes, and the subframes are arranged in the physical layer frame collectively by subframe groups which are collections of the subframes with FFT sizes, which are same, when fast Fourier transform (FFT) operation is performed on symbols included in the physical layer frame.

(10)

The data processing apparatus according to (9), in which the subframe groups are disposed in ascending order of the FFT sizes in the physical layer frame.

(11)

The data processing apparatus according to (10), in which an FFT size of the preamble is a same size as or a smaller size than a smallest FFT size among the FFT sizes of the subframes included in the physical layer frame.

(12)

The data processing apparatus according to (9), in which the subframe groups are disposed in descending order of the FFT sizes in the physical layer frame.

(13)

The data processing apparatus according to (12), in which an FFT size of the preamble is a same size as or a larger size than a largest FFT size among the FFT sizes of the subframes included in the physical layer frame.

(14)

The data processing apparatus according to any one of (9) to (13), in which the FFT sizes represent numbers of current samples for one FFT operation.

(15)

The data processing apparatus according to any one of (9) to (14), in which a modulation method of a signal processed in the demodulation processing is OFDM, and the physical layer frame includes a plurality of OFDM symbols.

(16)

A data processing method of a data processing apparatus, the method including:

a step of performing demodulation processing on a physical layer frame including a preamble, which includes a demodulation parameter, and one or more subframes, which include data, by the data processing apparatus, in which any demodulation parameter can be set for each of the subframes, and the subframes are arranged in the physical layer frame collectively by subframe groups which are collections of the subframes with FFT sizes, which are same, when FFT operation is performed on symbols included in the physical layer frame.

REFERENCE SIGNS LIST 1A, 1B Transmission system
10A, 10B Sending apparatus
20A, 20B Receiving apparatus
40 Transmission line
111 Encoder unit
112 Parameter control unit
113 Error correction encoding unit
114 Time interleaving unit
115 Frequency interleaving unit
116 OFDM sending unit
117 Quadrature modulation unit
118 RF/analog unit
211 RF/analog unit
212 Quadrature demodulation unit
213 OFDM receiving unit
214 Frequency deinterleaving unit
215 Time deinterleaving unit
216 Error correction decoding unit
217 Parameter control unit
218 Decoder unit
1000 Computer
1001 CPU

The invention claimed is:

1. A data processing apparatus comprising:
circuitry configured to perform modulation processing on
a physical layer frame including a preamble and plural subframes, wherein different fast Fourier transform (FFT) sizes are respectively set for at least two of the subframes, and
the subframes are arranged in the physical layer frame in contiguous subframe groups, each subframe group of the contiguous subframe groups including all subframes of the physical layer frame with a same FFT size, at least one subframe group of the contiguous subframe groups including plural subframes with the same FFT size, when inverse fast Fourier transform (IFFT) operation is performed on symbols included in the physical layer frame, and
an FFT size of the preamble of the physical layer frame is less than or equal to an FFT size of subframes in a subframe group immediately following the preamble.

2. The data processing apparatus according to claim 1, wherein the subframe groups are disposed in ascending order of FFT sizes in the physical layer frame.

3. The data processing apparatus according to claim 1, wherein the FFT sizes of the subframes represent numbers of samples to be subjected to one IFFT operation.

4. The data processing apparatus according to claim 1, wherein a modulation method of a signal processed in the modulation processing is orthogonal frequency division multiplexing (OFDM), and
the physical layer frame includes a plurality of OFDM symbols.

5. The data processing apparatus according to claim 1, wherein a distribution of pilot signals within each subframe in the physical layer frame is equal to in density or less dense than a distribution of pilot signals in any preceding subframe in the physical layer frame.

6. A data processing method of a data processing apparatus, the method comprising:
performing modulation processing on a physical layer frame including a preamble and plural subframes,
wherein different fast Fourier transforms (FFT) sizes are respectively set for at least two of the subframes,
the subframes are arranged in the physical layer frame in contiguous subframe groups, each subframe group of the contiguous subframe groups including all subframes of the physical layer frame with a same FFT size, at least one subframe group of the contiguous subframe groups including plural subframes with the same FFT size, when IFFT operation is performed on symbols included in the physical layer frame, and
an FFT size of the preamble of the physical layer frame is less than or equal to an FFT size of subframes in a subframe group immediately following the preamble.

7. The data processing method according to claim 6, wherein a distribution of pilot signals within each subframe in the physical layer frame is equal to in density or less dense than a distribution of pilot signals in any preceding subframe in the physical layer frame.

8. A data processing apparatus comprising:
circuitry configured to perfoiui demodulation processing on a physical layer frame including a preamble and plural subframes,
wherein different fast Fourier transform (FFT) sizes are respectively set for at least two of the subframes,
the subframes are arranged in the physical layer frame in contiguous subframe groups, each subframe group of the contiguous subframe groups including all subframes of the physical layer frame with a same FFT size, at least one subframe group of the contiguous subframe groups including plural subframes with the same FFT size, when fast Fourier transform (FFT) operation is performed on symbols included in the physical layer frame, and
an FFT size of the preamble of the physical layer frame is less than or equal to an FFT size of subframes in a subframe group immediately following the preamble.

9. The data processing apparatus according to claim 8, wherein the subframe groups are disposed in ascending order of FFT sizes in the physical layer frame.

10. The data processing apparatus according to claim 8, wherein the FFT sizes of the subframes represent numbers of samples to be subjected to one FFT operation.

11. The data processing apparatus according to claim 8, wherein a modulation method of a signal processed in the demodulation processing is OFDM, and
the physical layer frame includes a plurality of OFDM symbols.

12. The data processing apparatus according to claim 8, wherein a distribution of pilot signals within each subframe in the physical layer frame is equal to in density or less dense than a distribution of pilot signals in any preceding subframe in the physical layer frame.

13. A data processing method of a data processing apparatus, the method comprising:
performing demodulation processing on a physical layer frame including a preamble and plural subframes,
wherein different fast Fourier transform (FFT) sizes are respectively set for at least two of the subframes,
the subframes are arranged in the physical layer frame in contiguous subframe groups, each subframe group of the contiguous subframe groups including all subframes of the physical layer frame with a same FFT size, at least one subframe group of the contiguous subframe groups including plural subframes with the same FFT size, when FFT operation is performed on symbols included in the physical layer frame, and
an FFT size of the preamble of the physical layer frame is less than or equal to an FFT size of subframes in a subframe group immediately fallowing the preamble.

14. The data processing method according to claim 13, wherein a distribution of pilot signals within each subframe in the physical layer frame is equal to in density or less dense than a distribution of pilot signals in any preceding subframe in the physical layer frame.

* * * * *